US012704940B2

(12) United States Patent
Yuki et al.

(10) Patent No.: US 12,704,940 B2
(45) Date of Patent: Aug. 11, 2026

(54) COOKING RECIPE DISPLAY SYSTEM, COOKING RECIPE DISPLAY DEVICE, COOKING RECIPE DISPLAY METHOD, AND PROGRAM

(71) Applicant: Panasonic Intellectual Property Management Co., Ltd., Osaka (JP)

(72) Inventors: Yasuhiro Yuki, Kanagawa (JP); Masafumi Sadahira, Shiga (JP); Yuki Taoka, Kyoto (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 197 days.

(21) Appl. No.: 18/555,102

(22) PCT Filed: Apr. 12, 2022

(86) PCT No.: PCT/JP2022/017635
§ 371 (c)(1),
(2) Date: Oct. 12, 2023

(87) PCT Pub. No.: WO2022/224881
PCT Pub. Date: Oct. 27, 2022

(65) Prior Publication Data
US 2024/0192832 A1 Jun. 13, 2024

(30) Foreign Application Priority Data
Apr. 22, 2021 (JP) ................................ 2021-072233

(51) Int. Cl.
*G06F 3/0482* (2013.01)
*G06F 16/26* (2019.01)

(52) U.S. Cl.
CPC ........... *G06F 3/0482* (2013.01); *G06F 16/26* (2019.01)

(58) Field of Classification Search
CPC .............................. G06F 3/0482; G06F 16/26
See application file for complete search history.

(56) References Cited

U.S. PATENT DOCUMENTS 8,145,854 B1 * 3/2012 Lee ................. G06Q 10/06316 99/325
2010/0280895 A1 * 11/2010 Mottola ............ G06Q 30/0223 705/14.1

(Continued)

FOREIGN PATENT DOCUMENTS

| | | |
|---|---|---|
| JP | 2002-099624 | 4/2002 |
| JP | 2006-139554 | 6/2006 |
| JP | 2013-058061 A | 3/2013 |

OTHER PUBLICATIONS

International Search Report of PCT application No. PCT/JP2022/017635 dated Jul. 5, 2022.

(Continued)

*Primary Examiner* — Seth A Silverman
(74) *Attorney, Agent, or Firm* — Rimon P.C.

(57) ABSTRACT

The present disclosure is a cooking recipe display system that includes a information processing terminal including a display screen and a controller, and displays a cooking recipe on the display screen. The cooking recipe display system includes a recipe data manager and an ingredient profile manager. The recipe data manager manages a recipe database retaining a plurality of cooking recipes that indicate procedures indicating how to cook a dish and a plurality of ingredients used for the dish. The ingredient profile manager manages an ingredient profile indicating a necessity of each of the plurality of ingredients for each cooking recipes. On the basis of the ingredient profile, the controller displays, on the display screen, auxiliary information corresponding to (Continued)

the necessity of each of the plurality of ingredients included in a target recipe serving as one of the plurality of cooking recipes.

26 Claims, 38 Drawing Sheets

(56) References Cited

U.S. PATENT DOCUMENTS

| | | | | |
|---|---|---|---|---|
| 2014/0295382 | A1* | 10/2014 | Ko | G06Q 50/00 434/127 |
| 2019/0005555 | A1* | 1/2019 | Luke | G06Q 30/0611 |
| 2023/0289630 | A1* | 9/2023 | Redfern | G06F 16/9038 |

OTHER PUBLICATIONS

Makiko Hirano, "Proposal of Recipe Recommendation System Considering Alternative Foodstuffs", Proceedings (4) of the 79th National Convention (2017), Mar. 16, 2017, Information Processing Society of Japan, p. 4-371-4-372.

* cited by examiner

[Recipe group master DB]

| Recipe ID | Recipe name | Appeal point | Corresponding amount | Classification | Cooking method |
|---|---|---|---|---|---|
| R001 | Winged dumpling | Crispy finished ! | Two servings / Four servings | Main dish | Grilled food |
| R002 | Chinese stew chicken | Easy and convenient warm side dish | Two servings / Four servings | Main dish | Stewed food |
| R003 | Avocado salad | Easily & Power charged | Two servings / Four servings | Side dish | Dressed salad-like food |
| , , , | , , , | , , , | , , , | , , , | , , , |

FIG. 4

[Recipe ingredient table & Recipe specific ingredient profile table (R002: chinese stew chicken: two servings)]

111a 121

| Group | Ingredient ID | Ingredient name | Ingredient state | Amount | Another name | Ingredient classification | Necessity |
|---|---|---|---|---|---|---|---|
| | 6996 | Middle section of chicken wing | | 4 pieces (100g) | Chicken, chicken wing | Meat, chicken wing | 3: Substitutable |
| | 234 | Salt | | A little | Salt | Basic seasoning | 5: Essential |
| | 33 | Pepper | | A little | Pepper | Basic seasoning | 5: Essential |
| | 777 | Dried shiitake mushroom | | 2 pieces | | Dried foods | 2: Omissible |
| | 43 | Water | | 150ml | | Water | 5: Essential |
| | 4323 | Bok choi | | 1 head | Bok choi | Leafy vegetables | 4: Substitutable |
| | 4046 | Starch noodle | | 20g | Starch noodle | Noodles | 2: Omissible |
| A | 865 | Ginger | Thin slice | 3 slices | Ginger | Flavored vegetables | 3: Substitutable |
| A | 888 | Chinese star anise | | 1 piece | Anise | Special | 2: Omissible |
| A | 523 | Worcestershire sause | | 1 tablespoon | Sauce | Basic seasoning | 1: Optional |
| A | 80 | Soy sauce | | 1 teaspoon | Soy sauce | Basic seasoning | 5: Essential |
| A | 1052 | Honey | | 1/2 tablespoon | Honey | Special | 3: Substitutable |

[Recipe procedure table (R002: chinese stew chicken: two servings)]

| Procedure number | Procedure description |
|---|---|
| 001 | Cut the center of chicken wing, and add salt and pepper.<br>Put 150 ml of water and dried shiitake mushroom into heat-resistant glass ball with a diameter of approximately 25 cm, place in the center of a microwave oven, and heat at 600 W for substantially 1 minute.<br>Remove a stem and cut shiitake mushroom into half, and then return to the ball. |
| 002 | Divide bok choi into a stem and leaves, and cut each into 3 cm width.<br>Moisten starch noodles a little with water. |
| 003 | Add and mix ingredient “A” into the ball, and then put a middle section of chicken wing into the ball.<br>Put starch noodles, stem of bok-choi, and leaves of bok-choi into the ball in this order. Wrap and place them in the center of microwave oven, and then heat at 600W for 6 minutes to 8 minutes.<br>After heating, mix well. |

[Necessity table]

| Necessity | Meaning | Ingredient option-information presentation | Substitute ingredient presentation | Full display mode | Minimum display mode |
|---|---|---|---|---|---|
| 5 | Essential | Display of "essential" | — | ✓ | ✓ |
| 4 | Substitutable (Restricted) | Display of "substitutable" + choice option | See substitute ingredient profile of restricted target | ✓ | ✓ |
| 3 | Substitutable (Unrestricted) | Display of "substitutable" + choice option | See substitute ingredient profile of ingredient classification | ✓ | ✓ |
| 2 | Omissible | Display of "omissible" | — | ✓ | |
| 1 | Degree of adding according to one's taste | Display of "optional" | — | ✓ | |

FIG. 7

[Substitute ingredient profile table (Restricted)]

123a(123)

| Substitute ID | Category | Starting point ingredient | Substitute ingredient (Ingredient ID) | Taste comparison | Restrictions | Main nutrients | Major application |
|---|---|---|---|---|---|---|---|
| D001 | Leafy vegetables | Bok choi (4323) | Japanese mustard spinach(566) | Almost the same | | β carotene, calcium, iron, and vitamin C | Fried food, stewed food, dressed salad-like food, and salad |
| | | | Spinach (643) | Sweetness and umami taste up | Necessary for removing bitter taste | β carotene, potassium, and folic acid | Fried food, stewed food, dressed salad-like food, and salad |
| | | | Japanese radish leaves (532) | Almost the same | | β carotene, vitamin C, vitamin K, folic acid, and calcium | Fried food, stewed food, dressed salad-like food, and soup |
| | | | Turnip leaves (655) | Almost the same | | β carotene, vitamin B, vitamin C, and dietary fiber | Fried food, stewed food, dressed salad-like food, and soup |
| | | | Mizuna mustard (444) | Better texture | | Calcium, potassium, vitamin C, and dietary fiber | Stewed food, soup, and salad |
| | | | Watercress (1155) | Almost the same | | β carotene and calcium | Fried food, dressed salad-like food, and soup |
| | | | Arugula (6533) | Peculiar bitter taste | | β carotene, calcium, and vitamin C | Fried food, dressed salad-like food, and salad |
| | | | Rape blossoms (5678) | Peculiar bitter taste | Only available in spring | β carotene, vitamin E, potassium, folic acid, and vitamin C | Fried food, dressed salad-like food, and soup |
| D002 | Leafy vegetables | Cabbage (1112) | Chinese cabbage (442) | Soft | Watery | Potassium and calcium | Fried food, stewed food, soup, dressed salad-like food, and salad |
| | | | Lettuce (633) | Soft | | β carotene, vitamin C, vitamin E, potassium, and dietary fiber | Fried food, soup, and salad |
| | | | Japanese radish (111) | Before heating: hard / After heating: soft | Watery | Vitamin A, vitamin C, dietary fiber, and others | Fried food, stewed food, dressed salad-like food, soup, and salad |
| D003 | | | | | | | |
| ... | ... | ... | ... | ... | ... | ... | ... |

[Substitute ingredient profile table (Unrestricted)]

| Substitute ID | Category | Substitute ingredient (Ingredient ID) | Group | Taste comparison | Notes | Major application |
|---|---|---|---|---|---|---|
| D011 | Chicken | Chicken thigh (42) | G1, G3 | Moderate fat and iron | | Stewed food, soup, deep-fried food, and teriyaki |
| | | Chicken breast (122) | G4 | Low fat and slightly high protein / Simple and light taste | Be careful for dry feeling | Salad and steamed food |
| | | Chicken tenderloin (665) | G4 | Hight protein and low fat | | Salad, steamed food, and deep-fried food |
| | | Tip section of chicken wing (6995) | G1, G3 | Moderate fat and rich collagen | | Stewed food and deep-fried food |
| | | Middle section of chicken wing (6996) | G1, G3 | Slightly high fat | Cook quickly | Stewed food, deep-fried food, and steamed food |
| | | Chicken wing stick (6997) | G1 | Slightly low fat and thick | It takes time to cook | Stewed food |
| D012 | Pork | Shoulder loin (93) | G1 | Richness and umami taste | | Stewed food and fried food |
| | | Pork belly (44) | G1 | Richness and umami taste, thick fat, and vitamin B1 | | Stewed food, fried food, and steamed food |
| | | Loin (42) | G2, G3 | Soft and crunchy | | Deep-fried food and fried food |
| | | Fillet (17) | G2 | Fine and soft, low fat, vitamin B1, and simply light taste | | Deep-fried food and fried food |
| | | Round (80) | G1, G3 | Low fat and vitamin B1 | | Stewed food, deep-fried food, fried food, and steamed food |
| ... | ... | ... | ... | ... | ... | ... |

[Substitute ingredient profile table (Unrestricted)]

| Substitute ID | Category | Substitute ingredient (Ingredient ID) | Group | Taste comparison | Notes | Major application |
|---|---|---|---|---|---|---|
| D013 | Ground meat | Ground pork (56) | G2 | Richness and mellow texture | Lean ground pork and fatty ground pork are included. | Stewed food, deep-fried food, and fried food |
| | | Ground beef (66) | G2 | Strong umami taste, and elastic feeling and satisfaction are obtained. Less moisture, and less likely to be collapsed | Ground beef obtained by grinding only lean meat, coarse ground beef obtained by grinding meat coarsely, and the like are included. | Stewed food, deep-fried food, and fried food |
| | | Ground chicken (67) | G2 | Refreshing taste and healthy | Low fat / So as not to be dried | Stewed food and fried food |
| | | Firm tofu (89) / Thick deep-fried tofu (91) | G2 | Crumbling texture | Drain water off and fried / Richness and umami taste need to be compensated separately. | Stewed food and fried food |
| | | Tempe (199) | G2 | Mild and light, and soft and flaky | | Stewed food and deep-fried food |
| | | Wheel-shaped wheat gluten (443) | G2 | Fragrant | | Stewed food and deep-fried food |
| | | Soy meat (55) | G2 | Low calorie, low fat, high protein, rich dietary fibers, and gluten-free | | Stewed food, deep-fried food, and fried food |
| | | Freeze-dried tofu (95) | G2 | High protein, vitamin E, isoflavone, calcium, magnesium, vitamin K, iron, zinc, and dietary fibers | | Stewed food, deep-fried food, and fried food |
| ... | ... | ... | ... | ... | ... | ... |

FIG. 15

[Recipe ingredient table & Recipe specific ingredient profile table (R001: winged dumpling: two servings)]

111a | 421

| Group | Ingredient ID | Ingredient name | Ingredient state | Amount | Another name | Substitute group | Ingredient classification | Necessity | Influence degree on taste |
|---|---|---|---|---|---|---|---|---|---|
| | 473 | Dumpling skin | | 12 sheets | | | Powder | 5: Essential | 5 |
| Seed | 56 | Ground pork | | 150g | Ground meat | G2 | Meat, ground meat | 3: Substitutable | 4: Influence on texture / Fat and umami taste |
| Seed | 1112 | Cabbage | Chop into fine pieces | 40g | Cabbage | D002 | Leafy vegetables | 4: Substitutable | 4: Influence on texture / Fat and umami taste |
| Seed | 124 | Japanese leek | Chop into fine pieces | 10g | Welsh onion | | Flavored vegetables | 3: Substitutable | 4: Change in fragrance and flavor |
| Seed | 53 | Garlic chives | Chop into fine pieces | 10g | Garlic chives | | Flavored vegetables | 2: Omissible | 4: Change in fragrance and flavor / Avoidable if not desired |
| A | 43 | Water | | 150ml | | | Water | 5 | 5 |
| A | 210 | Flour | | 1/2 tablespoon | | | Powder | 5 | 5 |
| A | 81 | Vinegar | | 1 tablespoon | | | Basic seasoning | 2: Omissible | 4: Change in fragrance and flavor |
| A | 80 | Soy sauce | | 1 tablespoon | Soy sauce | | Basic seasoning | 5 | 5 |
| B | 211 | Potato starch | | 1 teaspoon | | | Powder | 5 | 5: Essential for forming wings |
| B | 43 | Water | | 3 tablespoons | | | Water | 5 | 5 |
| B | 69 | Oil | | 2 teaspoons | | | Cooking oil | 3: Substitutable | 3: Flavor arrangement using fragrance oil such as sesame oil |

[Influence degree table]

| Influence degree on taste | Meaning |
|---|---|
| 5 | A large influence on taste, flavor, and texture, and essential in this recipe / (Indispensable ingredients) |
| 4 | Any influence / (Be different in taste, flavor, and texture from original recipe design, and difficult to guarantee frame reproduction) |
| 3 | A little influence / (Be different in taste, flavor, and texture from original recipe design) |
| 2 | A slight influence / (No problem although difference in any of taste, flavor, and texture occurs) |
| 1 | No influence / (Omissible) |

[Stocked ingredient table]

| Stock ID | Ingredient name | Ingredient ID | Genre | Consumption period | Elapsed period |
|---|---|---|---|---|---|
| S001 | Wheel-shaped wheat gluten | 443 | Dried food | 365 days | 65 days |
| S002 | Soy meat | 55 | Dried food | 365 days | 120 days |
| S003 | Starch noodle | 4046 | Dried food | 500 days | 252 days |
| S004 | (Frozen) ground chicken | 67 | Chicken | 30 days | 10 days |
| S005 | (Frozen) pork belly | 44 | Pork | 30 days | 15 days |
| S006 | Brown sugar | 567 | Spice | 600 days | 320 days |
| ,,, | ,,, | ,,, | ,,, | ,,, | ,,, |

[Recipe procedure table (R001: winged dumpling: two servings)]

| Produce number | 1 | 2 |
|---|---|---|
| Display procedure | Mince cabbage / garlic chives / leek, and mix 150 ml of water, 1/2 tablespoon of flour, 1 tablespoon of vinegar / soy sauce in another container. | Put ground pork into ball, add seasonings, and mix well. When becomes sticky, add cabbage, garlic chives, and leek, and then mix. |
| Internal configuration | <Ingredient 1> <Slash> <Ingredient 2> <Slash> <Ingredient 3> <Cooking operation 1>, and <Utensil 1> <Ingredient 4> <Amount 4> and <Ingredient 5> <Amount 5>, <Ingredient 6> <Slash> <Ingredient 7> <Parallel expression 1> <Amount 6> <Cooking operation 2> | <Utensil 2> <Ingredient 8> <Cooking operation 3>, <Intermediate ingredient 1> <Cooking operation 4> and well <Cooking operation 5>. <Cooking-end condition 1>, <Ingredient 1>, <Ingredient 2>, and <Ingredient 3> <Cooking operation 4> and <Cooking operation 5> |
| Parameter value | <Ingredient 1> cabbage </Ingredient 1><br><Ingredient 2> garlic chives </Ingredient 2><br><Ingredient 3> leek </Ingredient 3><br><Cooking operation 1> mince </Cooking operation 1><br><Utensil 1> another container </Utensil 1><br><Ingredient 4> water </Ingredient 4><br><Amount 4> 150 ml </Amount 4><br><Ingredient 5> flour </Ingredient 5><br><Amount 5> 1/2 tablespoon </Amount 5><br><Ingredient 6> vinegar </Ingredient 6><br><Ingredient 7> soy sauce </Ingredient 7><br><Parallel expression 1> each </Parallel expression 1><br><Amount 6> 1 tablespoon </Amount 6><br><Cooking operation 2> mix </Cooking operation 2> | <Utensil 2> ball </Utensil 2><br><Ingredient 8> ground pork </Ingredient 8><br><Cooking operation 3> put </Cooking operation 3><br><Intermediate ingredient 1> seasoning </ Intermediate ingredient 1><br><Cooking operation 4> add </Cooking operation 4><br><<Cooking operation 5> mix </Cooking operation 5><br><Cooking-end condition 1> when becomes sticky < /Cooking-end condition 1> |
| Substitute value | <Ingredient 1> lettuce </Ingredient 1> | <Ingredient 8> ground chicken </Ingredient 8> |

FIG. 27
811c
[Illustrated image DB (R001: winged dumpling: two servings)]
| Procedure number | 1 |
|---|---|
| Related image | 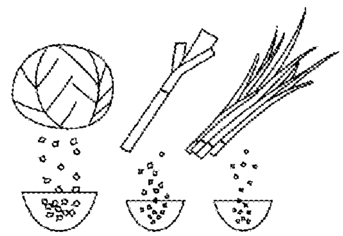 |
| Drawing specification for individual image | <img src="001.png" alt= =" ingredient 1"><br>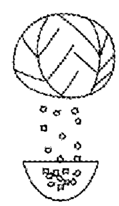<br><img src="002.png" alt= =" ingredient 2"><br>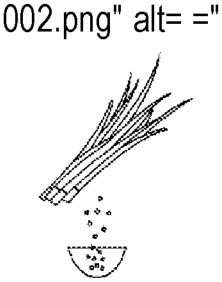<br><img src="003.png" alt= =" ingredient 3"><br>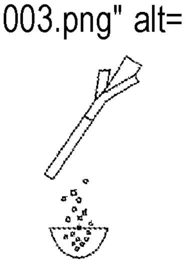 |

FIG. 28
825
[Substitute image replacing table]
| Substitute ID | Category | Starting point ingredient | Substitute ingredient (Ingredient ID) | Individual image |
|---|---|---|---|---|
| D002 | Leafy vegetables | Cabbage (1112) f101.png 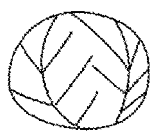 | Chinese cabbage (442) | f102.png  |
| | | | Lettuce (633) | f103.png 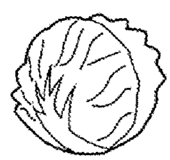 |
| | | | Japanese radish (111) | f104.png 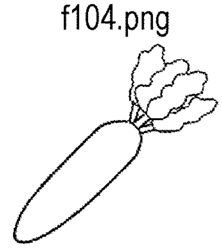 |

[Necessity count table]

| Recipe ID | Recipe name | Necessity: 5 | Necessity: 4 | Necessity: 3 | Necessity: 2 | Necessity: 1 |
|---|---|---|---|---|---|---|
| R001 | Winged dumpling | 6(3) | 1 | 3 | 2 | 0 |
| R002 | Chinese stew chicken | 4(0) | 1 | 3 | 3 | 1 |
| R003 | Avocado salad | 2(1) | 1 | 1 | 1 | 0 |
| R004 | Baked cauliflower pie | 4(4) | 4 | 2 | 0 | 0 |
| R005 | Pepper stuffed with meat | 4(2) | 4 | 3 | 1 | 0 |
| R006 | Japanese meat and potato stew | 2(0) | 2 | 2 | 1 | 0 |
| , , , | , , , | , , , | , , , | , , , | , , , | , , , |

COOKING RECIPE DISPLAY SYSTEM, COOKING RECIPE DISPLAY DEVICE, COOKING RECIPE DISPLAY METHOD, AND PROGRAM

CROSS-REFERENCE TO RELATED APPLICATIONS

This application is a U.S. national stage application of the PCT International Application No. PCT/JP2022/017635 filed on Apr. 12, 2022, which claims the benefit of foreign priority of Japanese patent application No. 2021-072233 filed on Apr. 22, 2021, the contents all of which are incorporated herein by reference.

TECHNICAL FIELD

The present disclosure relates to a cooking recipe display system.

BACKGROUND ART

Recently, there has been known a display system that displays a cooking recipe. Patent Literature 1 discloses a menu presentation system that displays a menu of a dish, which can be made using inputted main ingredients, from among a plurality of recipe information items stored in a storage unit. Patent Literature 2 discloses a nutritional component display system that displays a nutritional component of each ingredient together with a cooking recipe.

CITATION LIST

Patent Literature

PTL1: Unexamined Japanese Patent Publication No. 2002-99624

PTL2: Unexamined Japanese Patent Publication No. 2006-139554

SUMMARY OF THE INVENTION

It takes a lot of time and effort or cost to prepare all the ingredients indicated by a cooking recipe. An amount of information is increased with increase of the number of ingredients, so that time and effort or cost will be more required. For this reason, a cooking recipe for making equivalent dishes without preparing all the ingredients, e.g., arranging a part of the ingredients or the like, is desired.

The present disclosure provides a cooking recipe display system, a cooking recipe display device, a cooking recipe display method, and a program that can support an arrangement of a cooking recipe.

One aspect of the present disclosure is a cooking recipe display system that includes an information processing terminal including a display screen and a controller, and displays a cooking recipe on the display screen. The cooking recipe display system in accordance with the present aspect includes a recipe data manager and an ingredient profile manager.

The recipe data manager manages a recipe database that retains a plurality of cooking recipes indicating procedures indicating how to cook a dish and a plurality of ingredients to be used for the dish. The ingredient profile manager manages an ingredient profile that indicates a necessity of each ingredient, which is included in the plurality of ingredients, for each of the plurality of cooking recipes.

On the basis of the ingredient profile, the controller displays auxiliary information on the display screen. Herein, the auxiliary information corresponds to a necessity of each of the plurality of ingredients, which are included in a target recipe serving as one of the plurality of cooking recipes.

According to the present disclosure, an arrangement of a cooking recipe can be supported.

BRIEF DESCRIPTION OF DRAWINGS

FIG. 3 is a view showing an example of a recipe group master database in the cooking recipe display system in accordance with the first exemplary embodiment.

FIG. 4 is a view showing an example of a recipe ingredient table and an recipe specific ingredient profile table.

FIG. 5 is a view showing an example of a recipe procedure table.

FIG. 6 is a view showing an example of a necessity table.

FIG. 7 is a view showing an example of a restricted substitute-ingredient profile table.

FIG. 8 is a view showing an example of an unrestricted substitute-ingredient profile table.

FIG. 9 is a view showing an example of an unrestricted substitute-ingredient profile table.

FIG. 15 is a view showing an example of a recipe ingredient table and a recipe specific ingredient profile table.

FIG. 16 is a view showing an example of an influence degree table.

FIG. 23 is a view showing an example of a stocked ingredient table.

FIG. 26 is a view showing an example of a recipe procedure table.

FIG. 27 is a view showing an example of an illustrated image database.

FIG. 28 is a view showing an example of a substitute image replacing table.

FIG. 36 is a view showing an example of a necessity count table.

DESCRIPTION OF EMBODIMENTS

Figure 1:
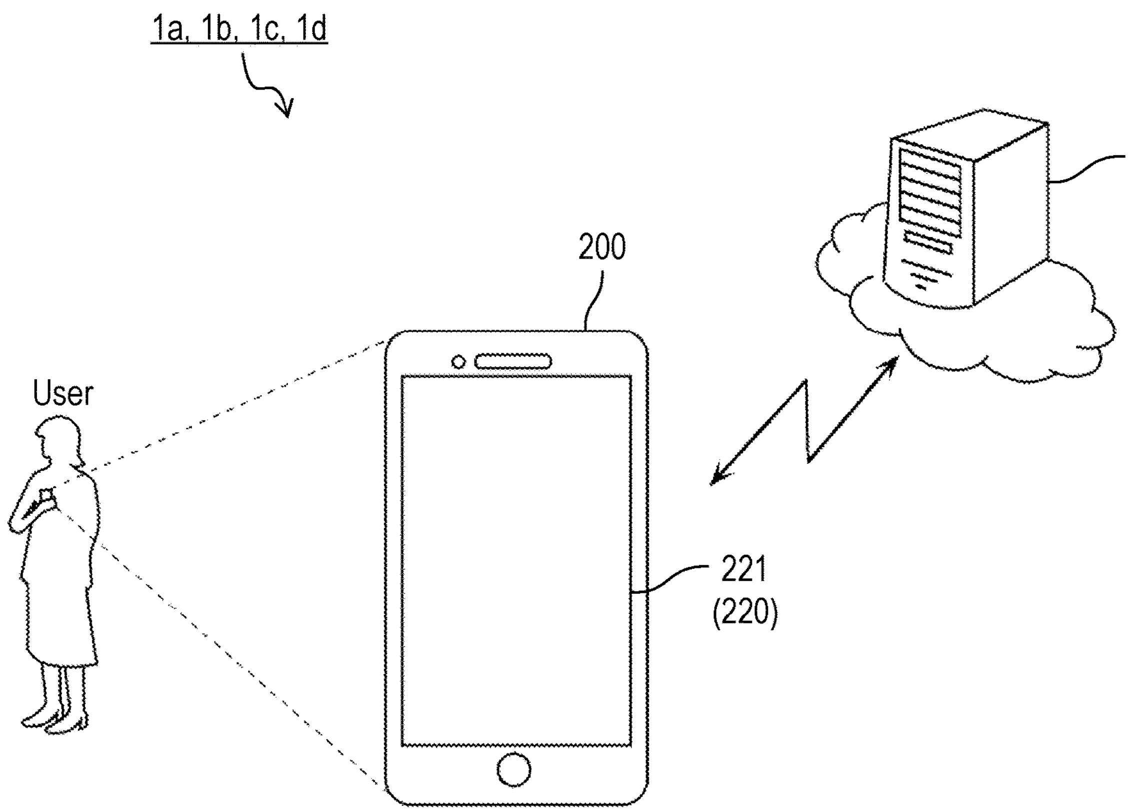
FIG. 1 is a view showing a schematic configuration of a cooking recipe display system in accordance with a first exemplary embodiment.

Exemplary embodiments of the present disclosure will be described specifically with reference to the drawings.

In the drawings, like reference signs indicate like elements in the figures. As such, overlapping explanations of like elements are omitted or simplified.

First Exemplary Embodiment

[Configuration]

Figure 2:
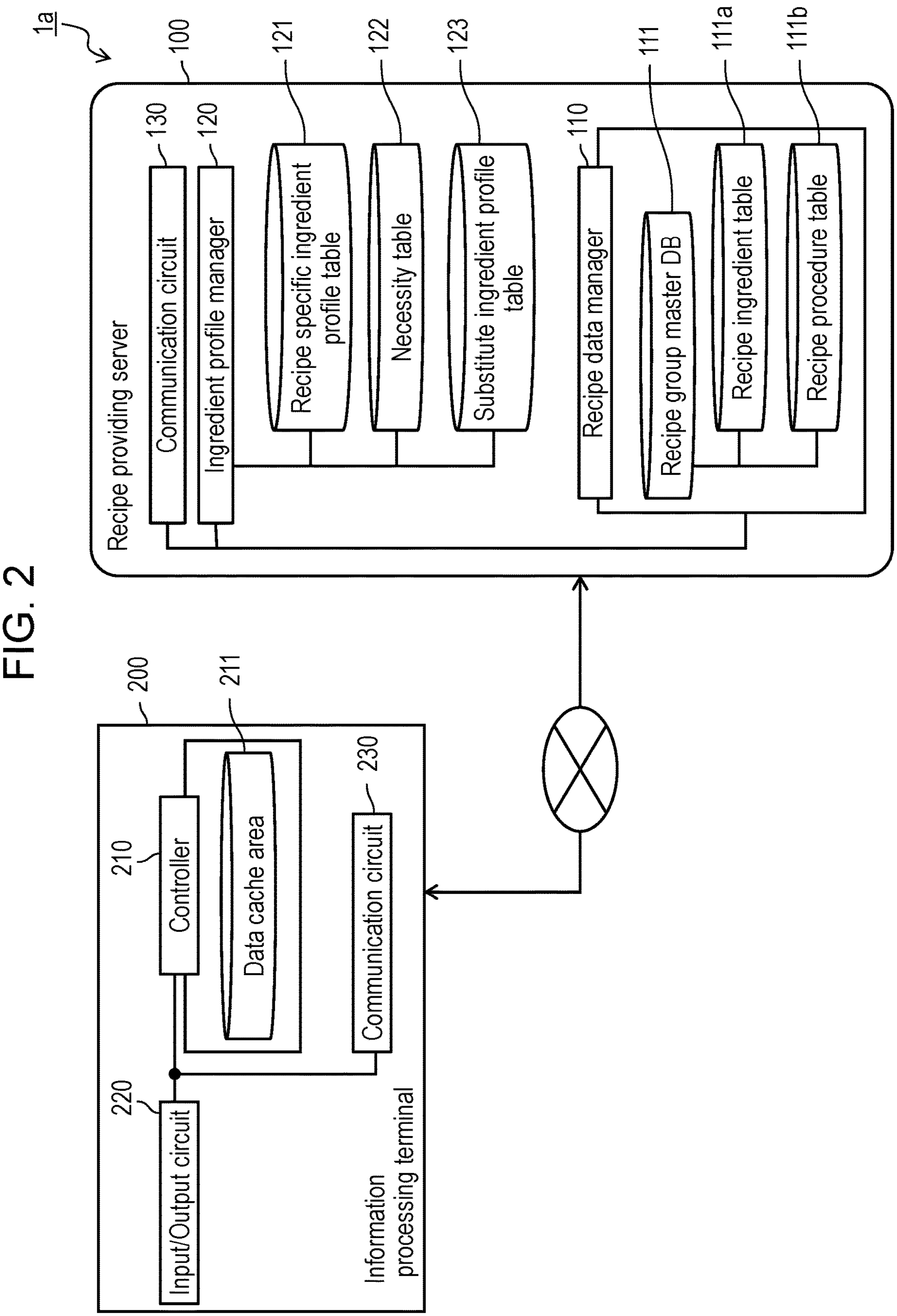
FIG. 2 is a block diagram showing a functional configuration of the cooking recipe display system in accordance with the first exemplary embodiment.

The entire configuration of cooking recipe display system 1*a* in accordance with a first exemplary embodiment of the present disclosure will be described with reference to FIGS. 1 and 2. FIG. 1 shows a schematic configuration of cooking recipe display system 1*a*. FIG. 2 shows a functional configuration of cooking recipe display system 1*a*.

As shown in FIGS. 1 and 2, cooking recipe display system 1*a* includes recipe providing server 100 and information processing terminal 200. Recipe providing server 100 is a web server. Recipe providing server 100 and information processing terminal 200 are communicably connected with each other via a network such as the Internet.

Recipe providing server 100 provides a cooking recipe. Recipe providing server 100 is a cloud server or a physical server. In addition to providing a cooking recipe, recipe providing server 100 also performs generation and/or management of the cooking recipe.

As shown in FIG. 2, recipe providing server 100 includes recipe data manager 110, ingredient profile manager 120, and communication circuit 130.

Recipe data manager 110 manages a recipe group master database (hereafter, the database may be abbreviated as "DB") 111.

FIG. 3 shows an example of recipe group master DB 111 in cooking recipe display system 1*a*. As shown in FIG. 3, recipe group master DB 111 retains a plurality of cooking recipes. The plurality of cooking recipes each include information related to "recipe ID," "recipe name," "appeal point," "corresponding amount", "classification", and "cooking method." However, it is not necessary for each cooking recipe to include all these information items.

The "recipe ID" indicates identification information for managing a cooking recipe. The "recipe name" indicates a name of a cooking recipe. The "appeal point" indicates an abstract sentence for characterizing a dish of a cooking recipe. The "corresponding amount" indicates a quantity of food when cooking is performed according to a cooking recipe. The "classification" indicates a kind of dish of a cooking recipe. The "cooking method" indicates a main method of cooking a dish of a cooking recipe.

Each cooking recipe includes an ingredient list that indicates a plurality of ingredients used for cooking, and one or more procedures (cooking procedure) that show how to make a dish. The ingredient list and the procedures include recipe terms expressed by natural language sentences.

The cooking recipe may also include an image (illustrated image) showing a cooked food or a food being cooked. The image is a static image in which an actual dish is photographed, for example. Instead of the static image, a moving image may be used. The image may be an illustrated image in which a dish is drawn schematically.

The "ingredient" includes not only foods such as meat and vegetables, but also a seasoning, water, or the like. Basically, the "ingredient" is ingredients which people can eat or drink, but may also include inedible ingredients that are used to improve the appearance of dishes.

A new cooking recipe may be added to recipe group master DB 111 and registered therein. Alternatively, an old cooking recipe registered in recipe group master DB 111 may be deleted. In other word, the cooking recipe retained in recipe group master DB 111 may be updated as necessary.

In recipe group master DB 111, the entire of a cooking recipe may be updated, or a part of the cooking recipe may be updated. Usually, a system administrator of recipe providing server 100 updates recipe group master DB 111. However, a user of cooking recipe display system 1*a* may perform the updating.

As shown in FIG. 2, recipe group master DB 111 includes recipe ingredient table 111*a* and recipe procedure table 111*b*.

Recipe ingredient table 111*a* retains information related to ingredients for each cooking recipe. Specifically, as the information related to ingredients, recipe ingredient table 111*a* retains ingredient data that constitutes an ingredient list, which indicates all ingredients used for a certain dish.

FIG. 4 shows an example of recipe ingredient table 111*a*. Specifically, FIG. 4 shows an example of recipe ingredient table 111*a* and recipe specific ingredient profile table 121, which are related to a recipe ID of "R002," i.e., "Chinese stew chicken: two servings." In FIG. 4, recipe ingredient table 111*a* is combined with recipe specific ingredient profile table 121, described later, and shown as one table. However, the present disclosure is not limited to this.

As shown in FIG. 4, the ingredient data retained in recipe ingredient table 111*a* include information related to "group," "ingredient ID," "ingredient name," "ingredient state," "amount," and "another name." A part of these information items may not necessarily be included in the ingredient data.

The "group" indicates a group to which an ingredient belongs, when a plurality of ingredients used for a certain dish are grouped. The grouping is performed based on an intermediate ingredient that is made in a cooking process, for example. In the example shown in FIG. 4, the plurality of ingredients belonging to group "A," such as "ginger" and "Chinese star anise," are used to make an intermediate ingredient.

The "ingredient ID" indicates identification information for managing an ingredient (e.g., identification number). The "ingredient name" indicates a name of an ingredient. The "ingredient state" indicates a state of an ingredient in a cooking process. The "amount" indicates a quantity of an ingredient used for cooking. The "another name" indicates an alias (an abbreviated name, a common name, or the like) of an ingredient.

The recipe procedure table 111*b* retains information related to one or more procedures for each cooking recipe. Specifically, as the information related to procedures, recipe procedure table 111*b* retains procedure data that constitute all procedures to make a certain dish. All the procedures each include the order, which is expressed by a numeral or the like, to be performed.

FIG. 5 shows an example of recipe procedure table 111*b*. Specifically, FIG. 5 shows an example of recipe procedure table 111*b* related to a recipe ID of "R002," i.e., "Chinese stew chicken: two servings."

As shown in FIG. 5, the procedure data retained in recipe procedure table 111*b* include information related to "procedure number" and "procedure description."

The "procedure number" indicates the order to be performed in cooking. The "procedure description" indicates specific cooking contents to be performed according to the procedure. The "procedure description" is expressed by a natural language sentence. By cooking according to the "procedure description," which is displayed, a user can make the dish indicated by a cooking recipe.

In other word, if the ingredients indicated by recipe ingredient table 111*a* are used to be cooked according to the order of procedures and the procedure description indicated by recipe procedure table 111*b*, a user can make the dish.

Ingredient profile manager 120 manages an ingredient profile. The ingredient profile includes option information for each cooking recipe. The option information indicates auxiliary features of each of a plurality of ingredients included in a certain dish. The auxiliary features include a necessity of each ingredient in a dish, for example.

Ingredient profile manager 120 manages a substitute ingredient profile. The substitute ingredient profile includes information indicating an ingredient (hereinafter, referred to as a substitute ingredient) that can be substituted for each of a plurality of ingredients.

As shown in FIG. 2, ingredient profile manager 120 includes recipe specific ingredient profile table 121, necessity table 122, and substitute ingredient profile table 123.

Recipe specific ingredient profile table 121 retains auxiliary information on a plurality of ingredients included in a dish, for each cooking recipe. Specifically, recipe specific ingredient profile table 121 retains ingredient profile data, which is an example of an ingredient profile, as the auxiliary information.

As shown in FIG. 4, the ingredient profile data retained in recipe specific ingredient profile table 121 includes information related to "ingredient classification" and "necessity." The "ingredient classification" indicates a kind of ingredient. The "necessity" indicates a necessity of an ingredient for a dish. The "necessity" is expressed by a numeral, for example.

In FIG. 4, the "necessity" includes not only a numeral but also a natural language sentence that represents a meaning of the numeral. However, the natural language sentence may not be included therein. The natural language sentence may be the same as the data retained in necessity table 122.

Necessity table 122 retains information related to the necessity. Specifically, as the information related to the necessity, necessity table 122 retains data indicating a specific meaning of the necessity, and data for displaying the necessity.

FIG. 6 shows an example of necessity table 122. As shown in FIG. 6, necessity table 122 includes information related to "necessity," "meaning," "ingredient option-information presentation," "substitute ingredient presentation," "full display mode," and "minimum display mode."

The "necessity" uses a numeral to indicate a necessity of an ingredient for a dish. The necessity indicates how much a dish needs an ingredient. The necessity is expressed by a plurality of stages, e.g., five stages of "1" to "5." The necessity may be expressed by two stages, three stages, or ten stages, for example.

The "meaning" represents a specific meaning of the necessity. In the present exemplary embodiment, the necessity is low as a numerical value, which is used to expresses the necessity, becomes smaller. In other word, an ingredient having a low necessity is not so important for making a dish. As the numerical value, which is used to expresses the necessity, becomes larger, the necessity is high. In other word, an ingredient having a high necessity is more important for making a dish.

Specifically, as shown in FIG. 6, a necessity of "1," which is the lowest, means an ingredient that may be "added according to one's taste (hereinafter, referred to as "optional")." A necessity of "2" means an ingredient that is "omissible." In other word, the necessity of "1" or "2" means an ingredient that is not necessarily used for making a dish.

A necessity of "3" means an ingredient that is "substitutable" without restrictions, i.e., means that an ingredient, which is optionally selected from predetermined candidate ingredients, can be substituted for the ingredient having a necessity of "3."

A necessity of "4" means an ingredient that is "substitutable" with restrictions, i.e., means that, among all the candidate ingredients, some predetermined ingredients cannot be substituted for the ingredient having a necessity of "4."

A necessity of "5," which is the highest, means an ingredient that is "essential," i.e., means that any other ingredient cannot be substituted for the ingredient having a necessity of "5."

The "ingredient option-information presentation" indicates ingredient option-information that is displayed on a display screen. The ingredient option-information is an example of auxiliary information corresponding to the necessity. The ingredient option-information is included in, for example, the ingredient display image of a cooking recipe and displayed together with ingredients included in the cooking recipe.

When the necessity is "1," a mark of "optional" is displayed. The mark of "optional" is an example of option information that means that an ingredient corresponding to this mark is omissible. When the necessity is "2", a mark of "omissible" is displayed. The mark of "omissible" is an example of option information. When the necessity is "3" or "4," a mark of "substitutable" is displayed. The mark of "substitutable" is an example of substitutable information that means that an ingredient corresponding to this mark can be substituted for other ingredients.

In the present exemplary embodiment, when the necessity is "3" or "4," a choice option of substitutable ingredients is displayed. The choice option of substitutable ingredients is a list of one or more ingredients (substitute ingredient) that can be substituted for an ingredient corresponding to the mark of "substitutable."

When the necessity is "5," a mark of "essential" is displayed. The mark of "essential" is an example of essential information that means that an ingredient corresponding to this mark is essential. A specific display example of each mark and a display example of substitute ingredients will be described later with reference to FIGS. 10 through 13.

The "substitute ingredient presentation" indicates a substitute ingredient profile table, which is referred to when the list (substitute list) of substitute ingredients is generated and displayed.

In the ingredient display image of a cooking recipe, the "full display mode" and the "minimum display mode" indicate a flag for each necessity. Herein, the flag means whether the ingredient option-information is displayed or not. The "full display mode" is a display mode in which the ingredient option information corresponding to all the necessities is displayed. In the "full display mode," all ingredients included in a cooking recipe and ingredient option information thereof are displayed.

The "minimum display mode" is a display mode in which the ingredient option information corresponding to necessities of "3" to "5" is displayed. In the "minimum display mode," the ingredient option information having a necessity of "2" or less is not displayed.

Substitute ingredient profile table 123 retains substitute information on a substitute ingredient. Substitute ingredient profile table 123 retains substitute ingredient profile data, which serves as an example of a substitute ingredient profile, as the substitute information. Substitute ingredient profile table 123 includes data of a table type that differs depending on the presence or absence of restrictions for the substitute ingredient.

FIG. 7 shows an example of restricted substitute ingredient profile table 123*a*. As shown in FIG. 7, substitute ingredient profile table 123*a* is an example of a first substitute ingredient table in which two or more substitute ingredients are associated with one ingredient among a plurality of ingredients. Herein, the two or more substitute ingredients can be substituted for the one ingredient.

Substitute ingredient profile table 123*a* includes information related to "substitute ID," "category," "starting point ingredient," "substitute ingredient," "taste comparison," "restrictions," "main nutrients," and "major application."

The "substitute ID" indicates identification information for managing a substitute ingredient. The "category" indicates an ingredient classification to which a starting point ingredient belongs.

The "starting point ingredient" indicates an ingredient, which serves as a starting point when the ingredient used for cooking is changed, and identification information for managing the above-mentioned ingredient. In other word, the "starting point ingredient" indicates one ingredient included in an ingredient list of a cooking recipe. The "substitute ingredient" indicates a plurality of ingredients (i.e., substitute ingredients), which can be substituted for the starting point ingredient, and identification information for managing each of the plurality of ingredients.

The "taste comparison" indicates a difference in taste when a substitute ingredient is used instead of the starting point ingredient. The "taste" includes not only a stimulus to a taste sense ("taste" in a narrow sense) but also flavor (a stimulus to a smell sense such as smell and scent) and texture (a stimulus to a touch sense such as filling feeling).

The "restrictions" indicates restrictions or notes when a substitute ingredient is used instead of the starting point ingredient. The restrictions or notes include restrictions such as "necessary for removing bitter taste" and notes based on characters of the ingredients such as "watery." The restrictions or notes further include restrictions related to food procurement such as "only available in spring." The "main nutrients" indicates main nutrients of a substitute ingredient. The "major application" indicates a main application for which a substitute ingredient is used.

In the example shown in FIG. 7, "Japanese mustard spinach," "spinach", "Japanese radish leaves," or the like can be substituted for "bok choi," which is a starting point ingredient. On the other hand, "Japanese mustard spinach" is not specified as a starting point ingredient, so that "bok choi" cannot be substituted for "Japanese mustard spinach."

In this way, substitute ingredient profile table 123*a* indicates one-way substitute ingredients. Even if ingredient B can be used instead of ingredient A, ingredient A may not be used instead of ingredient B. In other word, the substitution of ingredients may be restricted to only a one-way direction.

On the other hand, in the case where there are no restrictions in substitution of ingredients, the substitution can be performed freely between a plurality of ingredients. FIGS. 8 and 9 show an example of unrestricted substitute-ingredient profile table 123*b*. As shown in FIGS. 8 and 9, substitute-ingredient profile table 123*b* is an example of a second substitute ingredient table that indicates one or more groups to which the plurality of ingredients belong. Herein, the one or more groups are included in a plurality of groups that are classified based on an ingredient group in which ingredients are substitutable for each other.

Substitute-ingredient profile table 123*b* includes information related to "substitute ID," "category," "substitute ingredient," "group," "taste comparison," "notes," and "major application." The "substitute ID," "category," "substitute ingredient," "taste comparison," and "major application" each are the same as those included in substitute-ingredient profile table 123*a* shown in FIG. 7. The "notes" is almost the same as "restrictions."

In substitute-ingredient profile table 123*b*, each substitute ingredient is associated with the "group" instead of the "starting point ingredient." The "group" indicates a substitute group to which the corresponding ingredient belongs. A plurality of ingredients belonging to the substitute group can be substituted for each other. A substitute ingredient belongs to one or more substitute groups. A substitute ingredient may not belong to any of the groups.

For instance, in the example shown in FIGS. 8 and 9, "ground pork," "ground beef", and "loin" belong to group "G2," and are substitutable for each other. "Loin" and "round" belong to group "G3," and are substitutable for each other. However, the groups to which "round" and "ground pork" belong are not the same. Therefore, "round" and "ground pork" cannot be substituted for each other.

The information items included in substitute-ingredient profile tables 123*a* and 123*b* are not limited to the examples shown in FIGS. 7 through 9. For instance, the information related to "main nutrients" may be included in substitute-ingredient profile table 123*b*. The same ingredient may be included in both substitute-ingredient profile table 123*a* and substitute-ingredient profile table 123*b*.

Ingredient profile manager 120 determines and suggests one or more substitute ingredients with reference to substitute-ingredient profile table 123*a* or substitute-ingredient profile table 123*b*.

For instance, when suggesting a substitute ingredient related to an ingredient having a necessity of "4," ingredient profile manager 120 refers to restricted substitute-ingredient profile table 123*a* shown in FIG. 7. When suggesting a substitute ingredient related to an ingredient having a necessity of "3," ingredient profile manager 120 refers to unrestricted substitute-ingredient profile table 123*b* shown in FIGS. 8 and 9.

Communication circuit 130 communicates with the outside through a network. Communication circuit 130 is a communication adapter that can communicate with an external device or an external system, for example. Specifically, communication circuit 130 can communicate with information processing terminal 200.

As a communication method through communication circuit 130, WAN (wide area network), LAN (Local area network), power line communication, infrared ray communication, short-distance-radio communication, mobile data communication, and the like are employed.

Next, information processing terminal 200 will be described. Information processing terminal 200 is an information processing device that has display screen 221. Information processing terminal 200 is a portable information processing device such as a smart phone, a tablet computer, and a notebook type personal computer, for example.

Information processing terminal 200 may be a non-portable information processing device such as a desktop type personal computer, a smart display, and a signage.

In the present exemplary embodiment, as shown in FIG. 1, information processing terminal 200 is a smart phone that includes display screen 221 having both a display function and an operation function. In the present disclosure, information processing terminal 200 is equivalent to a cooking recipe display device.

Information processing terminal 200 has a network connection function. Accordingly, a user can operate information processing terminal 200 to access recipe providing server 100, search for cooking recipes, and select a cooking recipe to be used from among the obtained cooking recipes. The selected cooking recipe (specifically, cooking procedures and necessary ingredients) is displayed on display screen 221 of information processing terminal 200, and suggested to the user.

As shown in FIG. 2, information processing terminal 200 includes controller 210, input/output circuit 220, and communication circuit 230.

Controller 210 controls information processing terminal 200. Controller 210 controls input/output circuit 220 and communication circuit 230 to execute various functions of information processing terminal 200. Specifically, controller 210 includes a semiconductor memory in which a program, such as an application program, is stored, a processor that executes the program, and various kinds of input/output ports.

Controller 210 executes various kinds of controls such that the processor executes the program stored in the semiconductor memory. For instance, the processor is constituted by an MPU (micro processing unit), a CPU (central processing unit), a DSP (digital signal processor), a GPU (graphical processing unit), an SoC (system on a chip), or the like.

In the present exemplary embodiment, controller 210 displays a display image of a cooking recipe, which is determined through recipe providing server 100, on display screen 221 of input/output circuit 220. The display image of a cooking recipe includes a selection image for a cooking recipe, an ingredient display image indicating an ingredient list necessary for making a dish, which is indicated by the cooking recipe, and a procedure display image indicating a procedure of making a dish indicated by the cooking recipe.

Determination and generation of display contents, a layout, or the like of the display image may be performed by controller 210, or may be performed by a controller (not shown) of recipe providing server 100, recipe data manager 110, or ingredient profile manager 120.

Controller 210 has data cache area 211 serving as a working memory. For instance, controller 210 receives instructions from a user and then executes desired processing while accumulating information, which is necessary for the processing, in data cache area 211.

Input/output circuit 220 has functions of an input circuit and an output circuit. The input circuit receives an input (operation or the like) from a user, and the output circuit outputs the processing result, which is controlled by controller 210, or the like. In the present exemplary embodiment, input/output circuit 220 has display device equipped with display screen 221. For instance, input/output circuit 220 is a liquid crystal display device or an organic EL (electro luminescence) device.

Input/output circuit 220 is a user interface operated by a user. If information processing terminal 200 is a smart phone, input/output circuit 220 will be constituted by one touch panel. On the touch panel, a GUI (graphical user interface) image, which is suitable for user's touch operation, is displayed.

Input/output circuit 220 may be a voice input/output device such as a microphone or a speaker. In the present exemplary embodiment, input/output circuit 220 has functions of both an input circuit and an output circuit. However, the input circuit and the output circuit may be constituted by separate devices. In this case, the output circuit is a display device or a voice output device. The input circuit is a various kind of input devices such as a sensing device, a voice input device, a mouse, and a keyboard, for example.

Communication circuit 230 communicates with the outside through a network. Communication circuit 230 is an external device including recipe providing server 100, for example. Alternatively, communication circuit 230 may be a communication adapter that can communicate with an external system. Specifically, communication circuit 230 can communicate with recipe providing server 100.

As a communication method through communication circuit 230, a WAN, a LAN, power line communication, infrared ray communication, short-distance-radio communication, mobile communication for a mobile phone, and the like are employed.

Information processing terminal 200 may have a storage, which stores various kinds of data, independently. For instance, the storage may store a cooking recipe downloaded from recipe providing server 100. The storage includes a primary storage device such as a RAM (random access memory) or a ROM (read only memory). The storage may include an HDD (hard disk drive), an SSD (solid state drive), an optical disc, an SD card, or the like.

Specific Example of Display

In cooking recipe display system 1*a*, a specific example of the display image displayed on display screen 221 will be described.

Figure 10:
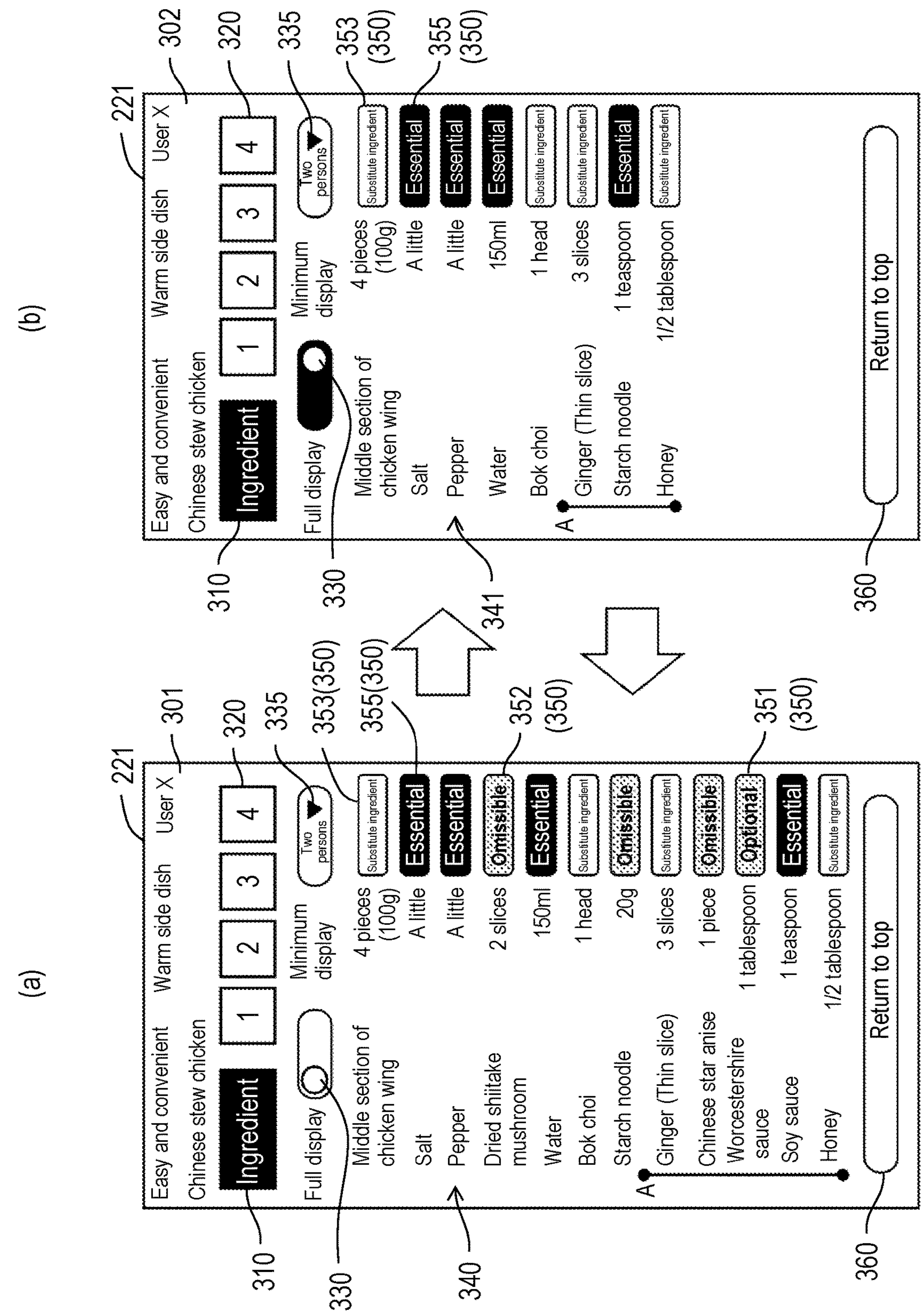
FIG. 10 is a view showing an example of an ingredient display image of a cooking recipe in the cooking recipe display system in accordance with the first exemplary embodiment.

FIG. 10 shows an example of an ingredient display image of a cooking recipe in cooking recipe display system 1*a*. In (a) of FIG. 10, ingredient display image 301 in a full display mode is shown. In (b) of FIG. 10, ingredient display image 302 in a minimum display mode is shown.

By controller 210 of information processing terminal 200, ingredient display images 301 and 302 are generated and displayed on display screen 221. Controller 210 generates ingredient display images 301 and 302 based on the information that is transmitted and received to and from recipe providing server 100 through communication circuit 130. By a controller (not shown) of recipe providing server 100, ingredient display images 301 and 302 may be generated and transmitted to information processing terminal 200 through communication circuit 130.

As an example, FIG. 10 shows ingredient display images 301 and 302 that are displayed when a recipe ID of "R002," i.e., "Chinese stew chicken" is selected as a target recipe. The target recipe, which is one of a plurality of cooking recipes, is a cooking recipe selected by a user, for example.

As shown in FIG. 10, ingredient display images 301 and 302 each include a text (natural language sentence) that expresses a recipe name and an appeal point of the target recipe. In this case, the recipe name is "Chinese stew chicken," and the appeal point is "easy and convenient warm side dish." The recipe name and the appeal point are obtained with reference to recipe group master DB 111 shown in FIG. 3.

Ingredient display images 301 and 302 each include a GUI object, which can be operated by a user. Specifically, ingredient display images 301 and 302 each include ingredient display button 310, procedure selection button 320, display switching button 330, amount selection button 335, and return button 360.

Ingredient display button 310 is a button for displaying ingredient display image 301 or ingredient display image 302. FIG. 10 shows the state where ingredient display button 310 has already been selected. For instance, brightness of the text and brightness of a background are reversed or the like to indicate whether ingredient display button 310 is selected or not. Ingredient display button 310 may not be included in ingredient display images 301 and 302.

Procedure selection button 320 includes four buttons for displaying procedures of the target recipe. Numbers of "1" to "4," which are assigned to the four buttons, correspond to procedure numbers. For instance, when procedure selection button 320 assigned to "1" is selected, a procedure display image indicating cooking procedure "1" of "Chinese stew chicken" is displayed on display screen 221. A specific example of the procedure display image will be described in the other exemplary embodiment.

Display switching button 330 is a button for switching the display mode to either a full display mode or a minimum display mode. For instance, by sliding a round mark displayed in display switching button 330 horizontally, a user can switch the display mode.

Amount selection button 335 is a button for selecting an amount in the cooking recipe. When amount selection button 335 is selected, the amount of each ingredient is changed. If recipe group master DB 111 has only one kind of corresponding amount, amount selection button 335 may not be displayed.

Return button 360 is a button for returning to an initial image. When return button 360 is selected, an initial image of cooking recipe display application, e.g., a search image of a cooking recipe or the like is displayed on display screen 221.

In the present exemplary embodiment, the number of ingredients displayed thereon differs between ingredient display image 301 in the full display mode and ingredient display image 302 in the minimum display mode.

For instance, as shown in (a) of FIG. 10, ingredient display image 301 in the full display mode, which is an example of a first ingredient display image, includes ingredient list 340. Ingredient list 340 shows all ingredients, which are indicated in the target recipe, and an amount of each ingredient as a list. All the ingredients and the list are obtained with reference to recipe ingredient table 111*a* shown in FIG. 4.

Furthermore, ingredient display image 301 includes auxiliary information icon 350 for each of all the ingredients in the target recipe. Auxiliary information icon 350 is displayed in a different manner according to a necessity of the corresponding ingredient. Specifically, auxiliary information icon 350 includes four kinds of icons (marks), i.e., omissible icons 351 and 352, substitutable icon 353, and essential icon 355.

Omissible icon 351 is a mark that means to be added according to one's taste, and corresponds to an ingredient having a necessity of "1." Omissible icon 351 includes a text of "optional." Omissible icon 352 is a mark that means to be no problem if not prepared, and corresponds to an ingredient having a necessity of "2." Omissible icon 352 includes a text of "omissible." Substitutable icon 353 is a mark that means to be "substitutable," and corresponds to an ingredient having a necessity of "3." Substitutable icon 353 includes a text of "substitute ingredient."

Herein, for necessities of "3" and "4," the same icon is used. However, different icons may be used. Essential icon 355 is a mark that means to be "essential," and corresponds to an ingredient having a necessity of "5." Essential icon 355 includes a text of "essential." In this way, a user can easily recognize the necessity of each ingredient, because the different texts are included in auxiliary information icon 350.

With respect to each ingredient, necessity table 122 and recipe specific ingredient profile table 121 are referred to determine which icon is displayed as auxiliary information icon 350.

Specifically, ingredient profile manager 120 obtains a necessity of each ingredient in the target recipe with reference to recipe specific ingredient profile table 121. With reference to necessity table 122, ingredient profile manager 120 obtains ingredient option information corresponding to the obtained necessity. This makes it possible to display the ingredient option information (auxiliary information), which corresponds to each ingredient, on display screen 221 as an icon.

Ingredient display image 301 in the full display mode is suitable for making a dish according to a recipe, because displaying all ingredients, which are necessary for a dish in the target recipe, as a list. Since auxiliary information icon 350 according to the necessity is displayed for all the ingredients, a user can easily recognize whether each ingredient is necessary or not, whether other ingredients can be substituted therefor, or the like.

A user does not always desire to make a dish according to a recipe, i.e., may desire to make an equivalent dish simply using the minimum ingredients. In such a case, ingredient display image 302 in the minimum display mode shown in (b) of FIG. 10, is suitable.

As shown in (b) of FIG. 10, ingredient display image 302 in the minimum display mode is an example of a second ingredient display image. In (b) of FIG. 10, an ingredient whose necessity is less than or equal to a predetermined value is not displayed.

The predetermined value is a threshold of necessity of the ingredient that is not displayed in the minimum display mode, e.g., "2." Among ingredients necessary for "Chinese stew chicken," four ingredients each of which a necessity is less than or equal to "2," i.e., "dried shiitake mushrooms," "starch noodles," "Chinese star anise," and "Worcestershire sauce" are omissible.

Ingredient names, amounts, and auxiliary information icons 350 of the four ingredients, i.e., "dried shiitake mushrooms," "starch noodles," "Chinese star anise," and "Worcestershire sauce" are not displayed in ingredient list 341 of ingredient display image 302. In ingredient list 341, the remaining ingredients are displayed at a space occupied by the omitted ingredients.

In this way, in ingredient display image 302 in the minimum display mode, a display of unnecessary ingredients is omitted to reduce an amount of information on display screen 221. This makes it easy for a user to recognize the displayed information. By switching a display mode to either the full display mode or the minimum display mode, the display is made suitable for user's preference.

In the present exemplary embodiment, when a user selects auxiliary information icon 350, predetermined information may be display on display screen 221.

Figure 11:
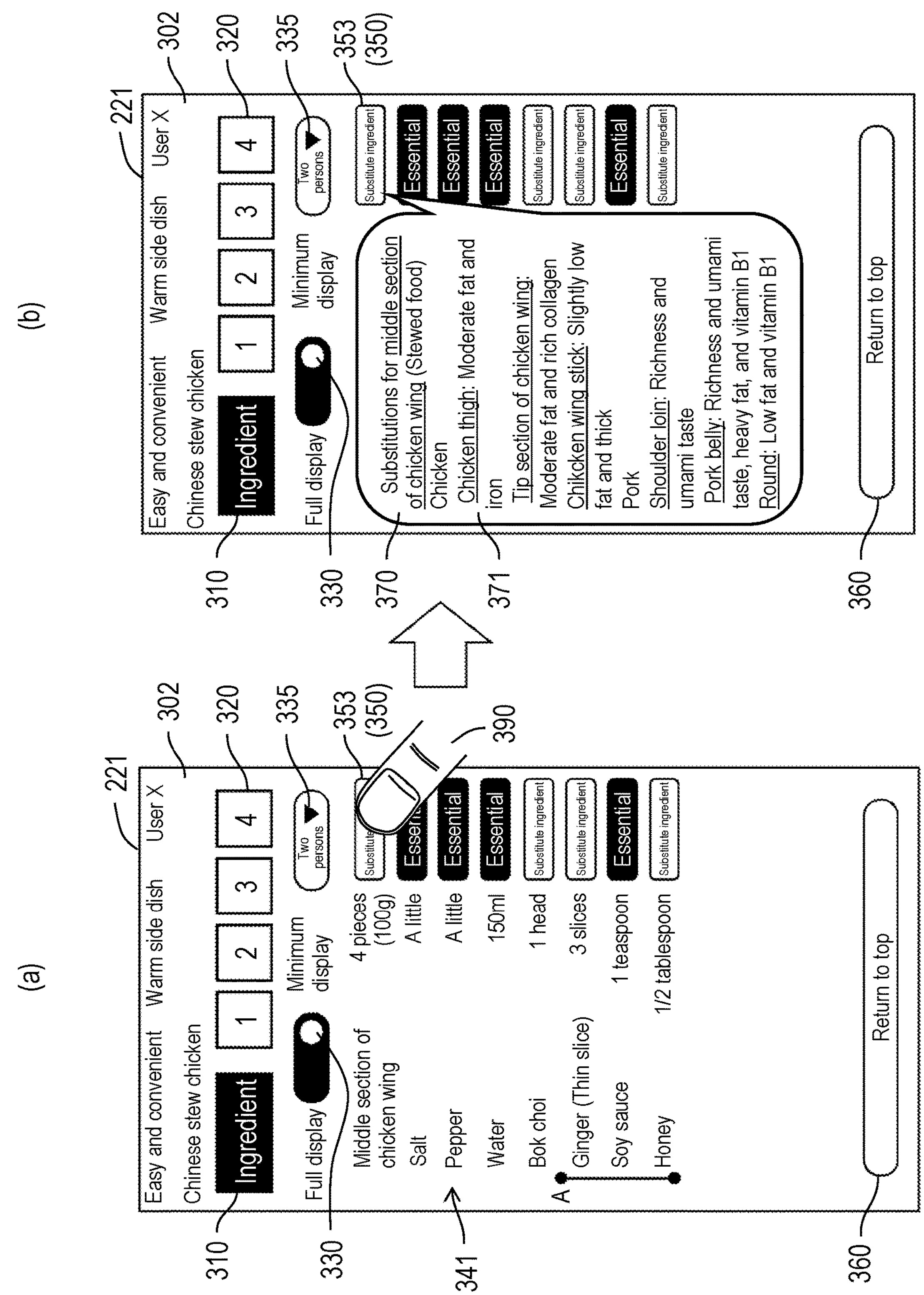
FIG. 11 is a view showing an example of a popup display of substitute ingredients on the ingredient display image of the cooking recipe in the cooking recipe display system in accordance with the first exemplary embodiment.

FIG. 11 shows an example of a popup display of substitute ingredients on ingredient display image 302 of a cooking recipe in cooking recipe display system 1*a*. Herein, ingredient display image 302 in the minimum display mode will be described as an example. However, the case of ingredient display image 301 in the full display mode is also the same as that of ingredient display image 302. Further, the cases of FIGS. 12 and 13, described later, are also the same as that of ingredient display image 302.

As shown in (a) of FIG. 11, a user touches substitutable icon 353, which corresponds to "a middle section of a chicken wing," to select substitutable icon 353. For instance, a user performs predetermined selection operations, such as tapping (single clicking), double clicking, holding down, and sliding a button or an icon, to select substitutable icon 353.

To tap (single clicking) a button is an operation such that a finger touches the displayed button image once. To double click a button is an operation such that a finger touches the displayed button image twice continuously. To hold down a button is an operation such that a finger continues to touch the displayed button for 1 second or more, for example. To slide a button is an operation such that a finger slides in any direction, while touching the displayed button image.

In FIG. 11 and the subsequent drawings, user's finger 390 is used to represent the user's selection.

When substitutable icon 353 is selected, substitute list image 370 is displayed as shown in (b) of FIG. 11. Herein, substitute list image 370 is a list of substitute ingredients. Substitute list image 370, which is a popup display, is superimposed on ingredient display image 302 and displayed.

Substitute list image 370 shows ingredient names 371 of one or more substitute ingredients, which are substituted for an ingredient corresponding to the selected substitutable icon 353, as a list. In this case, the above-mentioned ingredient is "a middle section of a chicken wing." Ingredient names 371 included in substitute list image 370 are determined by ingredient profile manager 120.

For instance, ingredient profile manager 120 refers to recipe specific ingredient profile table 121, shown in FIG. 4, to specify that "a middle section of a chicken wing," which is the selected ingredient, has a necessity of "3." Ingredient profile manager 120 refers to necessity table 122, shown in FIG. 6, to specify that unrestricted substitute-ingredient profile table 123*b* is referred for the ingredient having a necessity of "3."

Ingredient profile manager 120 refers to unrestricted substitute-ingredient profile table 123*b*, shown in FIG. 8, to specify that "a middle section of a chicken wing" belongs to groups of "G1" and "G3." Ingredient profile manager 120 specifies an ingredient, other than "a middle section of a chicken wing," that belongs to the specified groups of "G1" and "G3" as a substitute ingredient.

Specifically, ingredient profile manager 120 specifies six ingredients, i.e., "round," "a tip section of a chicken wing," "chicken wing stick," "shoulder loin," "pork belly," and "thigh" as a substitute ingredient. Thus, substitute list image 370 listing ingredient names 371 of the six ingredients specified above is displayed on display screen 221, as shown in (b) of FIG. 11.

In the present exemplary embodiment, substitute list image 370 includes not only ingredient name 371 but also information indicating characteristics of the corresponding ingredient. Herein, substitute list image 370 includes information related to "taste comparison" of substitute ingredient profile table 123*b*. However, the present disclosure is not limited to this. For instance, in addition to the information related to "taste comparison" or instead thereof, substitute list image 370 may also include information related to "notes."

Figure 12:
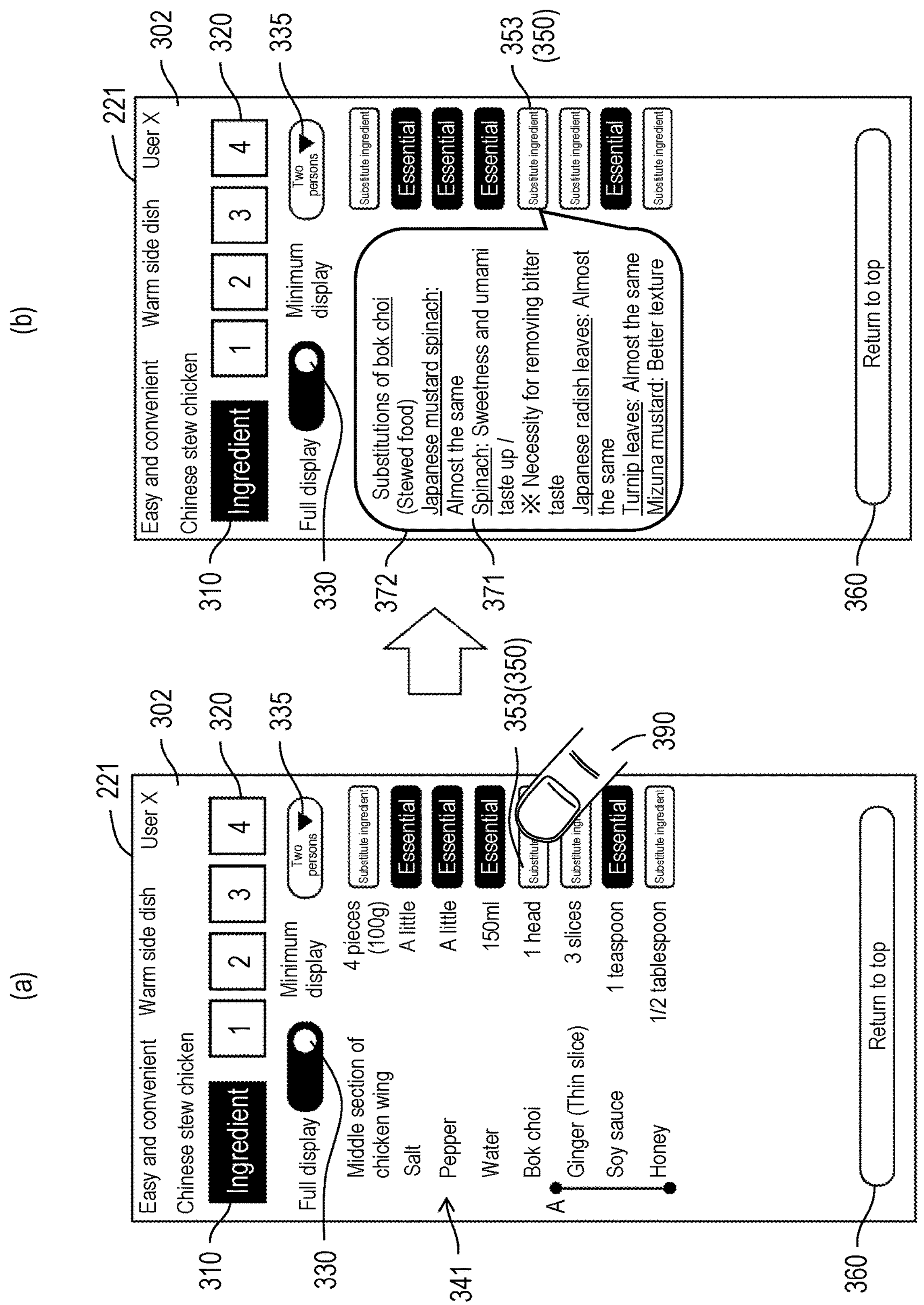
FIG. 12 is a view showing another example of the popup display of substitute ingredients on the ingredient display image of the cooking recipe in the cooking recipe display system in accordance with the first exemplary embodiment 1.

FIG. 12 shows another example of a popup display of substitute ingredients on ingredient display image 302 of a cooking recipe in cooking recipe display system 1*a*. As shown in (a) of FIG. 12, a user selects substitutable icon 353 corresponding to "bok choi," for example.

"Bok choi" is a restricted ingredient having a necessity of "4" (see recipe specific ingredient profile table 121 of FIG. 4). Accordingly, ingredient profile manager 120 refers to restricted substitute-ingredient profile table 123*a* shown in FIG. 7. As a substitute ingredient, eight ingredients, i.e., "Japanese mustard spinach" and the like are associated with "bok choi," which serves as a starting point ingredient.

In this case, ingredient profile manager 120 may specify only one part of the eight candidate ingredients as a substitute ingredient. In other word, the substitute ingredients displayed on display screen 221 may be narrowed down.

For instance, ingredient profile manager 120 specifies a substitute ingredient from candidate ingredients based on "major application" of the ingredient. Specifically, ingredient profile manager 120 (or recipe data manager 110) refers to recipe group master DB 111 shown in FIG. 3 to specify that a cooking method of the target recipe, i.e., "Chinese stew chicken" is "simmered dish."

Ingredient profile manager 120 specifies only an ingredient of which "major application" includes the cooking method of the target recipe, i.e., "simmered dish" among the candidate substitute ingredients as a substitute ingredient. Specifically, ingredient profile manager 120 specifies five ingredients, i.e., "Japanese mustard spinach," "spinach," "Japanese radish leaves," "turnip leaves," and "mizuna" from substitute ingredient profile table 123*a* shown in FIG. 7 as a substitute ingredient.

"Watercress," "arugula," and "rape blossoms" are excepted from the substitute ingredient because "major application" of those does not include "simmered dish." Thus, substitute list image 372, which lists ingredient names 371 of only the five ingredients specified above, is displayed on display screen 221, as shown in (b) of FIG. 12.

Substitute ingredients need not be narrowed down based on "major application." When unrestricted substitute-ingredient profile table 123*b* is referred, substitute ingredients may not be narrowed down based on "major application." Substitute ingredients may be narrowed down based on "taste comparison" or "main nutrients."

In the present exemplary embodiment, ingredient name 371 included in substitute list image 370 or substitute list image 372 may be selectable by a user. For instance, when ingredient name 371 is selected, ingredient list 340 of ingredient display image 301 or ingredient list 341 of ingredient display image 302 is updated.

Figure 13:
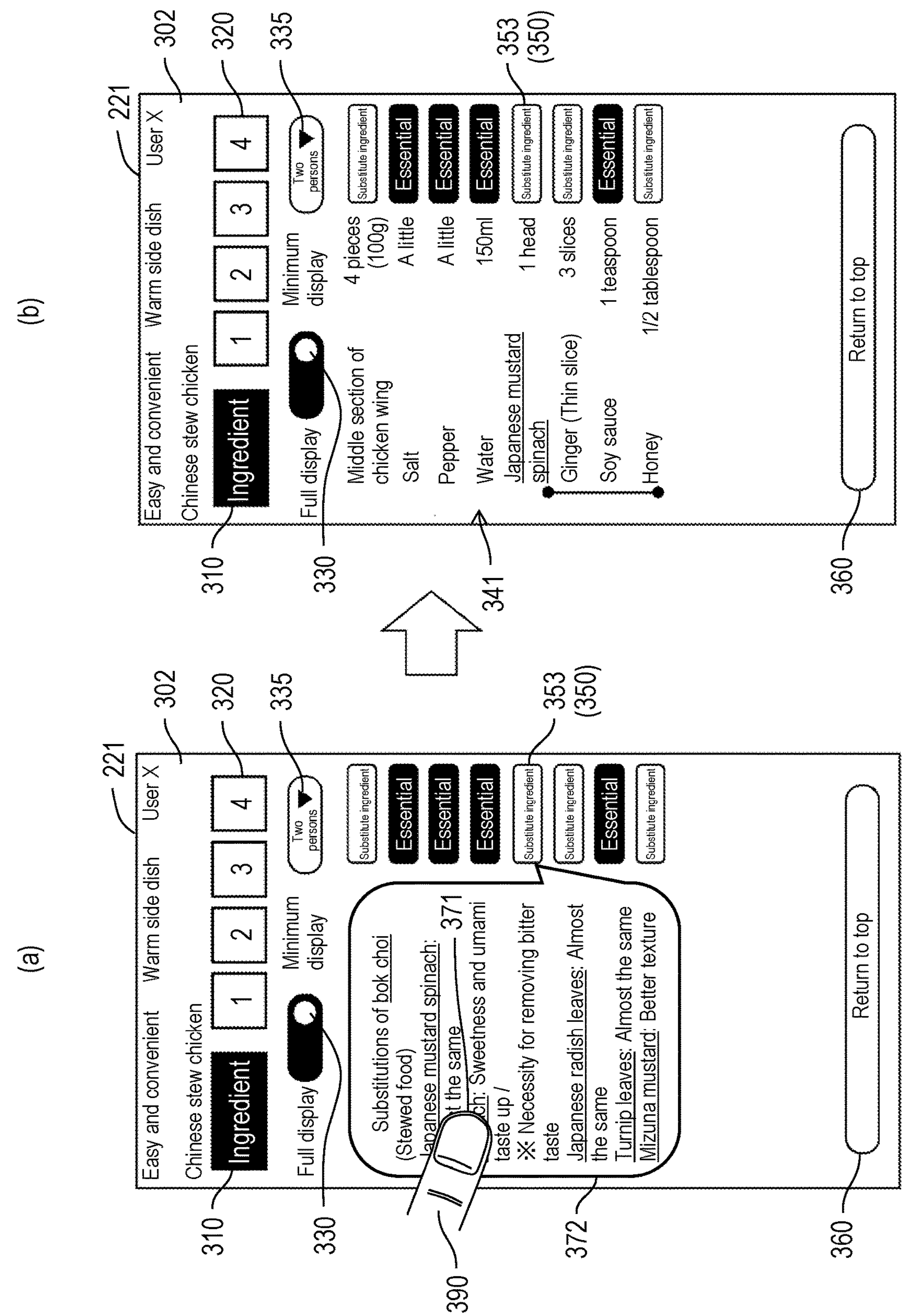
FIG. 13 is a view showing an example of an ingredient display image on which a substitute ingredient, which is selected in the popup display shown in FIG. 12, is reflected.

FIG. 13 shows an example of an ingredient display image on which the substitute ingredient, which is selected in the popup display shown in FIG. 12, is reflected. When ingredient name 371 indicating "Japanese mustard spinach" is selected as shown in (a) of FIG. 13, the display of substitute list image 372 is deleted and the selected "Japanese mustard spinach" is displayed instead of "bok choi" as shown in (b) of FIG. 13. At this time, if an amount of the after-selected ingredient differs from an amount of the before-selected ingredient, the amount of the after-selected ingredient will be displayed.

In (b) of FIG. 13, the changed portion (specifically, Japanese mustard spinach) is underlined. To clarify the changed portion, the underline is given, but not necessarily needed. To emphasize the changed portion, a size, thickness, a color, or the like of the character may be changed instead of the underline.

The popup display is used for displaying substitute list image 370 in FIGS. 11 through 13. However, an image to be displayed on display screen 221 may be changed. In other word, substitute list image 370 may be displayed on display screen 221 instead of ingredient display image 302.

A user's selection operation is received by input/output circuit 220 to perform display control assigned to the selection operation. Different display controls, which are performed corresponding to a plurality of selection operations, may be assigned to one button or one icon. For instance, the contents of a popup image when substitutable icon 353 is tapped may be different from the contents of a popup image when substitutable icon 353 is held down.

For instance, when return button 360 is tapped, the image displayed immediately before may be displayed on display screen 221. When return button 360 is held down, an initial image (recipe search image) may be displayed on display screen 221.

For instance, if a user selects an ingredient from among ingredients having a low necessity, only the selected ingredient may not be displayed on ingredient display image 301 in the full display mode. For instance, in (a) of FIG. 10, "dried shiitake mushrooms" and "starch noodles" are selected as an ingredient not to be used by a user. In this case, the ingredient names, amounts, and auxiliary information icons 350 related to "dried shiitake mushrooms" and "starch noodles" may be deleted from ingredient display image 301. In other word, a user's selection display mode may be provided between the full display mode and the minimum display mode as an intermediate display mode.

Ingredient display images 301 and 302 may be expanded and/or shrunk depending on a size of display screen 221, or displayed in a scrollable manner. For instance, if all ingredients of a target recipe can hardly be displayed in one screen, the image may be shrunk or displayed in a scrollable manner.

The layout of ingredient display images 301 and 302 is not limited to the example shown in each figure. For instance, auxiliary information icon 350 is placed on the right-hand side of an amount of an ingredient name in ingredient list 340 or ingredient list 341. However, auxiliary information icon 350 may be placed on the left-hand side of an ingredient name. The arrangement of a button, an icon, a text, or the like can be changed as necessary.

[Additional Remark]

As mentioned above, a first aspect of the present disclosure is a cooking recipe display system that includes information processing terminal 200, which is equipped with display screen 221 and controller 210, and displays a cooking recipe on display screen 221. Cooking recipe display system 1*a* in accordance with the present aspect includes recipe data manager 110 and ingredient profile manager 120.

Recipe data manager 110 manages a recipe database that retains a plurality of cooking recipes each including one or more procedures indicating how to cook a dish and a plurality of ingredients used for the dish. Ingredient profile manager 120 manages an ingredient profile that indicates a necessity of each of the plurality of ingredients for each cooking recipe.

On the basis of the ingredient profile, controller 210 displays, on display screen 221, auxiliary information corresponding to the necessity of each of the plurality of ingredients included in a target recipe, which serves as one of the plurality of cooking recipes.

Thus, the auxiliary information corresponding to the necessity is displayed on display screen 221. A user can determine whether the ingredient is needed or not. Accordingly, not necessarily-needed ingredients can be avoided from being displayed. According to cooking recipe display system 1*a*, an arrangement of a cooking recipe can be supported.

Ingredient profile manager 120 may further manage a substitute ingredient profile that indicates an ingredient substitutable for each of the plurality of ingredients. The substitute ingredient profile may also include a first substitute ingredient table in which an ingredient, which is substitutable for each of the plurality of ingredients, is associated with each of the plurality of ingredients. The substitute ingredient profile may also include a second substitute ingredient table in which, among a plurality of groups that are classified based on ingredient groups substitutable for each other, one or more groups to which each of the plurality of ingredients belongs is indicated.

Thus, a substitute ingredient, which is substitutable for each of the plurality of ingredients, can be suggested to a user. Instead of ingredients included in a cooking recipe, a user can use the substitute ingredient, suggested above, to make an equivalent dish.

For each of a plurality of ingredients, a difference in taste when each of the plurality of ingredients is used substitutionally, notes, restrictions, or applications are associated with each of the plurality of ingredients by the substitute ingredient profile.

Thus, auxiliary information related to a substitute ingredient can be suggested to a user, thereby making it possible to support user's selection of a substitute ingredient. Controller 210 generates a first ingredient display image (e.g., full display mode) that includes all ingredients, which are included in a target recipe, and auxiliary information related to each of all the ingredients. Controller 210 displays the first ingredient display image on display screen 221.

Controller 210 further generates a second ingredient display image (e.g., minimum display mode) of which a display mode for at least one part of all the ingredients is different from that of the first ingredient display image depending on the necessity. Controller 210 displays either the first ingredient display image or the second ingredient display image on a display screen.

Thus, depending on ingredients prepared by a use, a full display mode and a minimum display mode can be switched. As a result, a user's convenience can be improved.

Among all ingredients, an ingredient having a necessity of a predetermined value or less is not displayed in the second ingredient display image.

Thus, a display of unnecessary ingredients is omitted, so that an amount of information on display screen 221 is reduced. This makes it easy for a user to recognize the displayed information.

The auxiliary information includes substitutable information. The substitutable information indicates that an ingredient corresponding to the above-mentioned substitutable information is substitutable. Controller 210 can receive a selection of the substitutable information displayed on display screen 221. When the substitutable information is selected, controller 210 displays a list of substitute ingredients, which are substitutable for the ingredient corresponding to the above-mentioned substitutable information, on display screen 221.

Thus, a user can use the substitute ingredients displayed on display screen 221 to make an equivalent dish.

Controller 210 can receive a selection of the substitute ingredients displayed on display screen 221. When a substitute ingredient, which is one of the above-mentioned substitute ingredients, is selected, controller 210 displays an ingredient display image on a display screen. The ingredient display image includes the substitute ingredient instead of the ingredient corresponding to the substitutable information.

Thus, an ingredient display image after the substitute ingredient is selected is displayed. As a result, a user can be prevented from being confused when preparing ingredients.

Controller 210 displays a list of substitute ingredients and information indicating characteristics of the substitute ingredients on a display screen.

Thus, the information indicating characteristics of the substitute ingredients is displayed. When selecting a substitute ingredient, a user can use information indicating characteristics of the substitute ingredient. For instance, it is made possible to suggest a difference in taste when the substitute ingredient is used or the like, in advance. In this way, according to cooking recipe display system 1*a*, an arrangement of a cooking recipe through a user can be supported.

A second aspect of the present disclosure is a cooking recipe display device that includes a display screen and a controller, and displays a cooking recipe on the display screen.

On the basis of an ingredient profile, the controller displays auxiliary information corresponding to a necessity of each of a plurality of ingredients, which are included in a target recipe, on the display screen for each of a plurality of cooking recipes. The plurality of cooking recipes each include one or more procedures that indicate how to cook a dish, and a plurality of ingredients used for the dish. The ingredient profile indicates a necessity of each of the plurality of ingredients. The target recipe is one of the plurality of cooking recipes.

A third aspect of the present disclosure is a cooking recipe display method of displaying a cooking recipe on a display screen. The cooking recipe display method has the following processes.

On the basis of an ingredient profile, auxiliary information corresponding to a necessity of each of a plurality of ingredients, which are included in a target recipe, is displayed on display screen 221 for each of a plurality of cooking recipes. The plurality of cooking recipes each include one or more procedures that indicate how to cook a dish, and a plurality of ingredients used for the dish. The ingredient profile indicates a necessity of each of the plurality of ingredients. The target recipe is one of the plurality of cooking recipes.

A fourth aspect of the present disclosure is a program that causes a computer to execute the above-mentioned cooking recipe display method, or a recording medium in which the above-mentioned program is stored.

According to these aspects, an arrangement of a cooking recipe can be supported.

Second Exemplary Embodiment

A second exemplary embodiment of the present disclosure will be described. In the present exemplary embodiment, a different point from the first exemplary embodiment will mainly be described, and the description of a common point therebetween will be omitted or simplified.

[Configuration]

Figure 14:
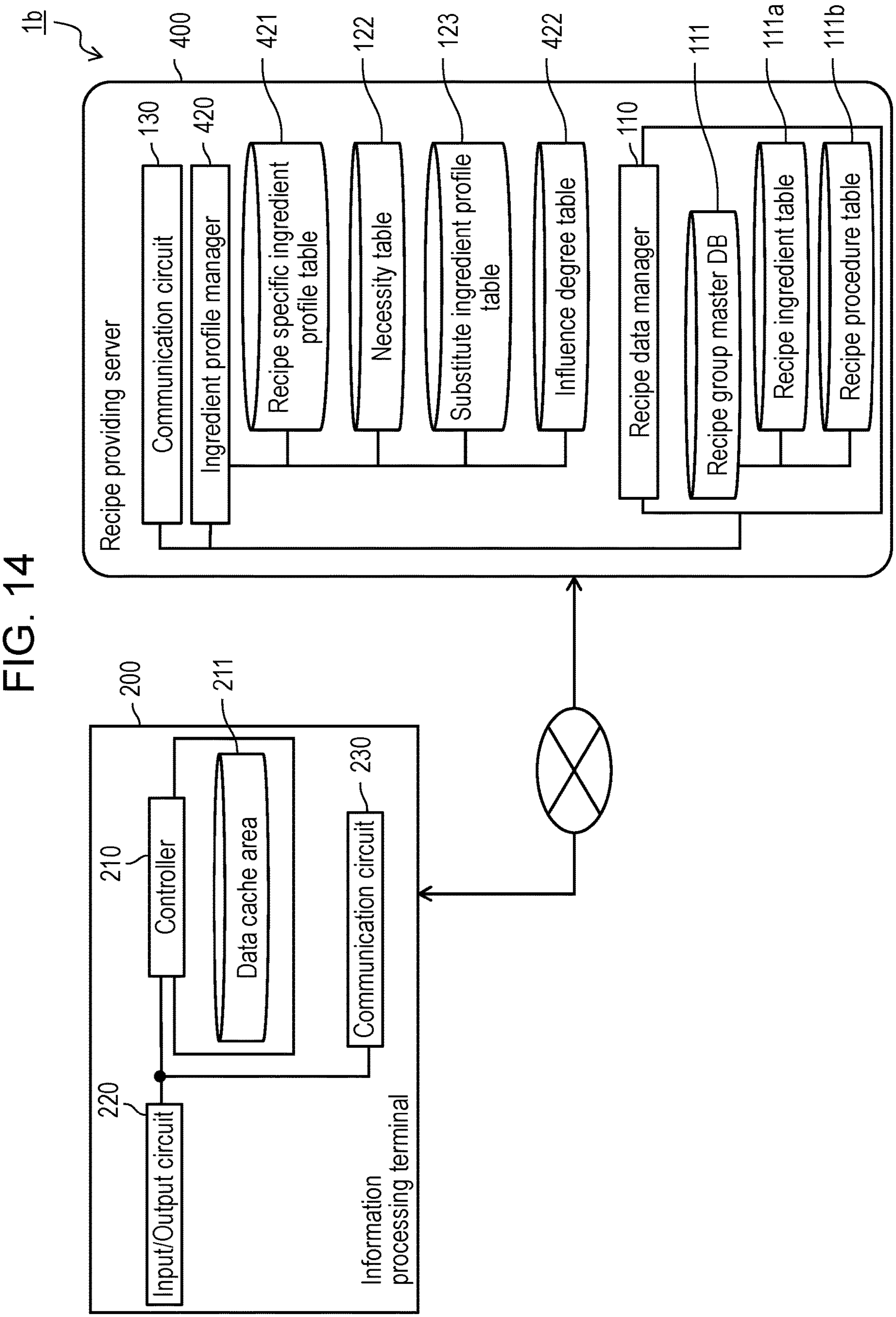
FIG. 14 is a block diagram showing a functional configuration of a cooking recipe display system in accordance with a second exemplary embodiment.

Cooking recipe display system 1*b* in accordance with the present exemplary embodiment has the same schematic configuration as in cooking recipe display system 1*a* shown in FIG. 1. FIG. 14 shows a functional configuration of cooking recipe display system 1*b*. As shown in FIG. 14, cooking recipe display system 1*b* includes recipe providing server 400 and information processing terminal 200. Information processing terminal 200 is the same as information processing terminal 200 in accordance with the first exemplary embodiment.

Unlike recipe providing server 100 in accordance with the first exemplary embodiment, recipe providing server 400 includes ingredient profile manager 420 instead of ingredient profile manager 120. In addition to ingredient profile manager 120 in accordance with the first exemplary embodiment, ingredient profile manager 420 manages influence degree table 422. Ingredient profile manager 420 manages recipe specific ingredient profile table 421 instead of recipe specific ingredient profile table 121.

Recipe specific ingredient profile table 421 includes not only a necessity of each ingredient but also an influence degree of each ingredient on a cooking taste as auxiliary characteristics of ingredients. FIG. 15 shows an example of recipe ingredient table 111*a* and recipe specific ingredient profile table 421 related to a recipe ID of "R001," i.e., "winged dumpling: two servings."

As shown in FIG. 15, the ingredient profile data retained in recipe specific ingredient profile table 421 includes information related to "influence degree on taste." The "influence degree on taste" indicates an influence degree of an ingredient on a cooking taste. The "influence degree on taste" is expressed by a numeral, for example.

In FIG. 15, the "influence degree on taste" may also include a natural language sentence that represents meaning of each numeral, in addition to the numeral. The "influence degree on taste" may not include a natural language sentence. The natural language sentence may be the same as the data retained in influence degree table 422. The natural language sentence, which is included in the information related to the "influence degree on taste" in recipe specific ingredient profile table 421, is used to be displayed on display screen 221, for example.

Influence degree table 422 retains information related to an influence degree on taste. The information related to an influence degree on taste is data in which an influence degree on taste is described specifically.

FIG. 16 shows an example of influence degree table 422. As shown in FIG. 16, influence degree table 422 includes information related to "influence degree on taste" and "meaning."

The "influence degree on taste" indicates an influence degree of each ingredient on a cooking taste using a numeral. The influence degree on taste is expressed by a plurality of stages, for example, five stages of "1" to "5." The influence degree on taste may be expressed by two stages, three stages, or ten stages, for example.

The "meaning" represents a specific meaning of an influence degree on taste. In the present exemplary embodiment, an influence degree on taste is small as the numerical value thereof becomes smaller. In other word, this means that, even if an ingredient having a low influence degree is not used, a cooking taste is not affected at all. Further, an influence degree on taste is high as the numerical value becomes large. In other word, this means that, if an ingredient having a high influence degree is not used, the cooking taste according to a cooking recipe cannot be obtained.

Specifically, an influence degree of "1," which is the lowest, means an ingredient having no influence on taste, as shown in FIG. 16. In other word, an influence degree of "1" means an omissible ingredient. An influence degree of "2" means an ingredient having a slight influence, i.e., a degree of causing no problem, although a difference in any of taste, flavor, and texture occurs.

An influence degree of "3" means an ingredient having a little influence, i.e., a degree of changing taste, flavor, or texture from an original recipe design. An influence degree of "4" means an ingredient having any influence, i.e., a degree of making a completely different dish whose taste, flavor, and texture are different from an original recipe design.

An influence degree of "5" means an ingredient having a great influence on taste, flavor, and texture, i.e., an essential ingredient for a cooking recipe. Recipe specific ingredient profile table 421 may also include a reason why the ingredient is essential for a cooking recipe.

There is a certain correlation between an influence degree on taste and a necessity. Basically, an ingredient having an influence degree on taste of "5" has a necessity of "5," for example. An ingredient having an influence degree on taste of "1" has a necessity of "1" or "2." An influence degree of each ingredient on a taste may be determined independently on a necessity.

Like necessity table 122, influence degree table 422 may also include information related to "ingredient option-information presentation." For instance, the ingredient option-information presentation in influence degree table 422 may indicate auxiliary information that is displayed on a display screen and corresponds to each influence degree on taste.

Specific Display Example

In cooking recipe display system 1*b*, a specific example of the display image displayed on display screen 221 will be described.

Cooking recipe display system 1*b* is different in a display mode of a minimum display mode from cooking recipe display system 1*a*. An ingredient display image in a minimum display mode in accordance with the present exemplary embodiment will be described with reference to FIG. 17.

Figure 17:
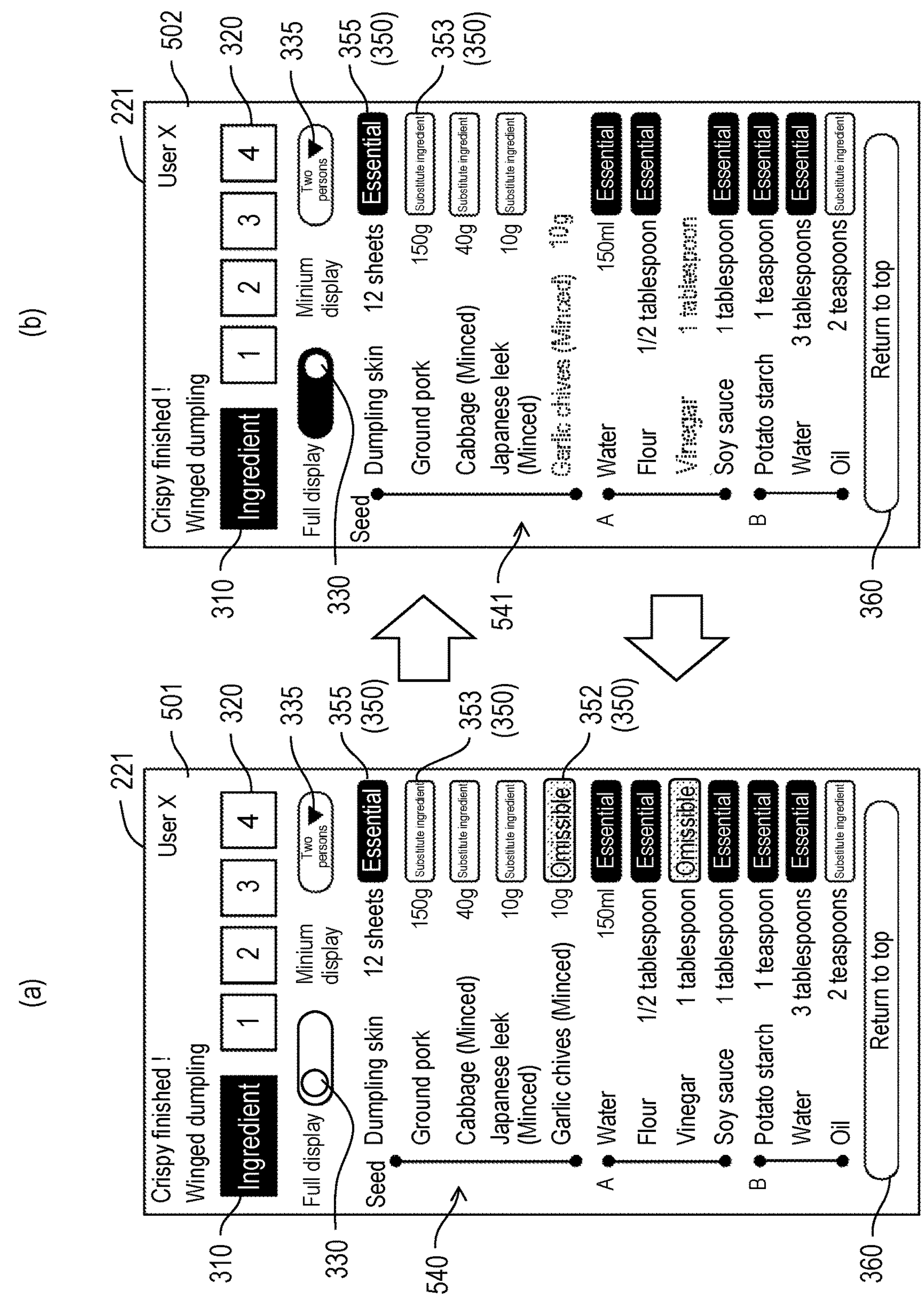
FIG. 17 is a view showing an example of an ingredient display image of a cooking recipe in the cooking recipe display system in accordance with the second exemplary embodiment.

FIG. 17 shows an example of an ingredient display image of a cooking recipe in cooking recipe display system 1*b*. In (a) of FIG. 17, ingredient display image 501 in a full display mode is shown. In (b) of FIG. 17, ingredient display image 502 in a minimum display mode is shown.

As an example, FIG. 17 shows ingredient display image 501 and ingredient display image 502 that are displayed when a recipe ID of "R001," i.e., "winged dumpling" is selected as a target recipe, specifically. Ingredient display image 501 and ingredient display image 502 each include a recipe name and an appeal point corresponding to "winged dumpling."

Ingredient display image 501 and ingredient display image 502 each include ingredient display button 310, procedure selection button 320, display switching button 330, amount selection button 335, and return button 360. These buttons each have the same function as in the first exemplary embodiment.

Ingredient display image 501 and ingredient display image 502 include ingredient list 540 and ingredient list 541 in which ingredients of "winged dumpling" are listed, respectively. Further, ingredient display image 501 and ingredient display image 502 also include a plurality of auxiliary information icons 350.

Like the case of the first exemplary embodiment, ingredient list 540 is a list that includes all ingredients of "winged dumpling," which is a target recipe, and an amount of each ingredient thereof. A method of generating ingredient list 540 in a full display mode is the same as that of the first exemplary embodiment.

Ingredient display image 502 in a minimum display mode in the present exemplary embodiment is an example of a second ingredient display image, and also includes an ingredient having a low necessity. In other word, ingredient list 541 in a minimum display mode is a list that includes all the ingredients of the target recipe, like ingredient list 540 in a full display mode.

In ingredient list 541, the ingredient having a necessity of a predetermined value or less is displayed in a different display mode from an ingredient having a necessity of more than the predetermined value is. Specifically, in ingredient list 541, the ingredient having a necessity of a predetermined value or less is displayed thinner than ingredients having a necessity of more than the predetermined value.

For instance, as shown (b) of FIG. 17, the necessities of "garlic chives" and "vinegar" are low. Therefore, for "garlic chives" and "vinegar," the ingredient names, the cooking methods, and the amounts all are displayed thinner than those of the other ingredients. Auxiliary information icon 350 related to the ingredient having a necessity of a predetermined value or less is not included. The way how to specify the ingredient having a necessity of a predetermined value or less is the same as in the first exemplary embodiment.

In this way, the present exemplary embodiment can cause a user to recognize that an ingredient to be originally used is omissible, while suggesting the ingredient in a minimum display mode.

In the present exemplary embodiment, a plurality of display modes are distinguished by different character colors. However, a display method of distinguishing the display modes is not limited to this. For instance, an ingredient name or the like of the ingredient having a necessity of a predetermined value or less may be displayed in a blinking manner, or may be displayed so as to apply a strikethrough line or the like thereto. Any of two or more kinds of ingredient display images, which have different display modes, may be displayed according to user's selection. An ingredient display image of a kind previously set up by a user may be displayed.

In cooking recipe display system 1*b*, a substitute list image, which is displayed when substitutable icon 353 is selected, is different from that in the first exemplary embodiment. Hereinafter, a specific example of a substitute list image in accordance with the present exemplary embodiment will be described with reference to FIG. 18.

Figure 18:
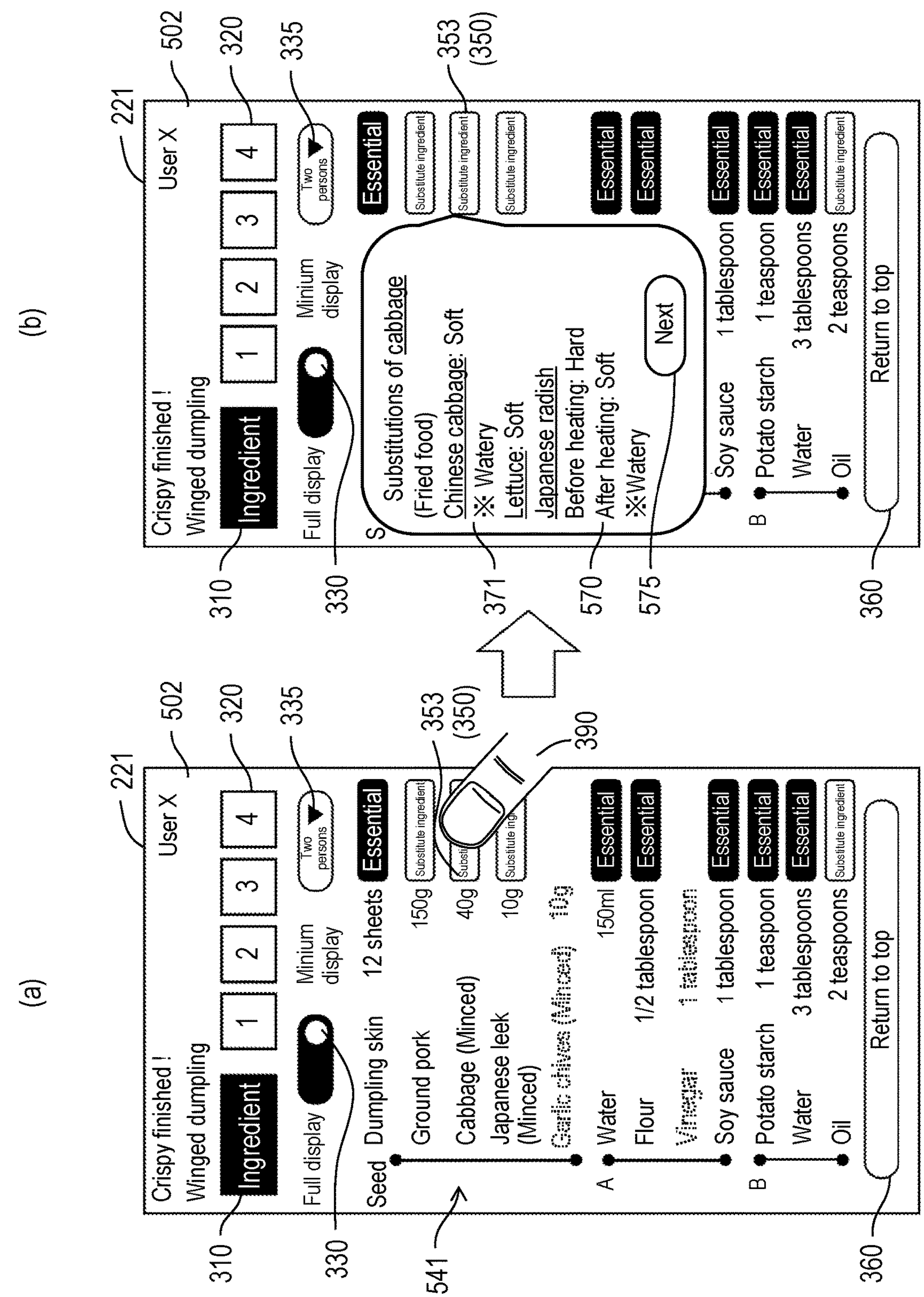
FIG. 18 is a view showing an example of a popup display of substitute ingredients on the ingredient display image of the cooking recipe in the cooking recipe display system in accordance with the second exemplary embodiment.

FIG. 18 shows an example of a popup display of substitute ingredients on ingredient display image 502 of a cooking recipe in cooking recipe display system 1*b*. Herein, ingredient display image 502 in a minimum display mode will be described as an example. However, the case of ingredient display image 501 in a full display mode is the same. Further, the cases of FIGS. 19, 21, and 24, described later, are also the same.

As shown in (a) of FIG. 18, a user selects substitutable icon 353 corresponding to "cabbage." "Cabbage" is a restricted ingredient, which has a necessity of "4" (see recipe specific ingredient profile table 421 of FIG. 15). Accordingly, ingredient profile manager 420 refers to restricted substitute ingredient profile table 123*a* shown in FIG. 7.

As a substitute ingredient, three ingredients, i.e., "Chinese cabbage," "lettuce," and "Japanese radish" are associated with "cabbage," which is a starting point ingredient. Therefore, substitute list image 570, i.e., a list including ingredient names 371 of these three ingredients is generated and displayed on display screen 221, as shown (b) of FIG. 18.

Substitute list image 570 includes not only ingredient name 371 but also information indicating characteristics of the corresponding ingredient. Specifically, substitute list image 570 includes information related to "restrictions" of substitute ingredient profile table 123*a*.

Substitute list image 570 includes display switching button 575. When a user selects display switching button 575, display contents of substitute list image 570 are switched. A user performs the above-mentioned selection through selection operation such as tapping (single clicking) or holding down the button.

Figure 19:
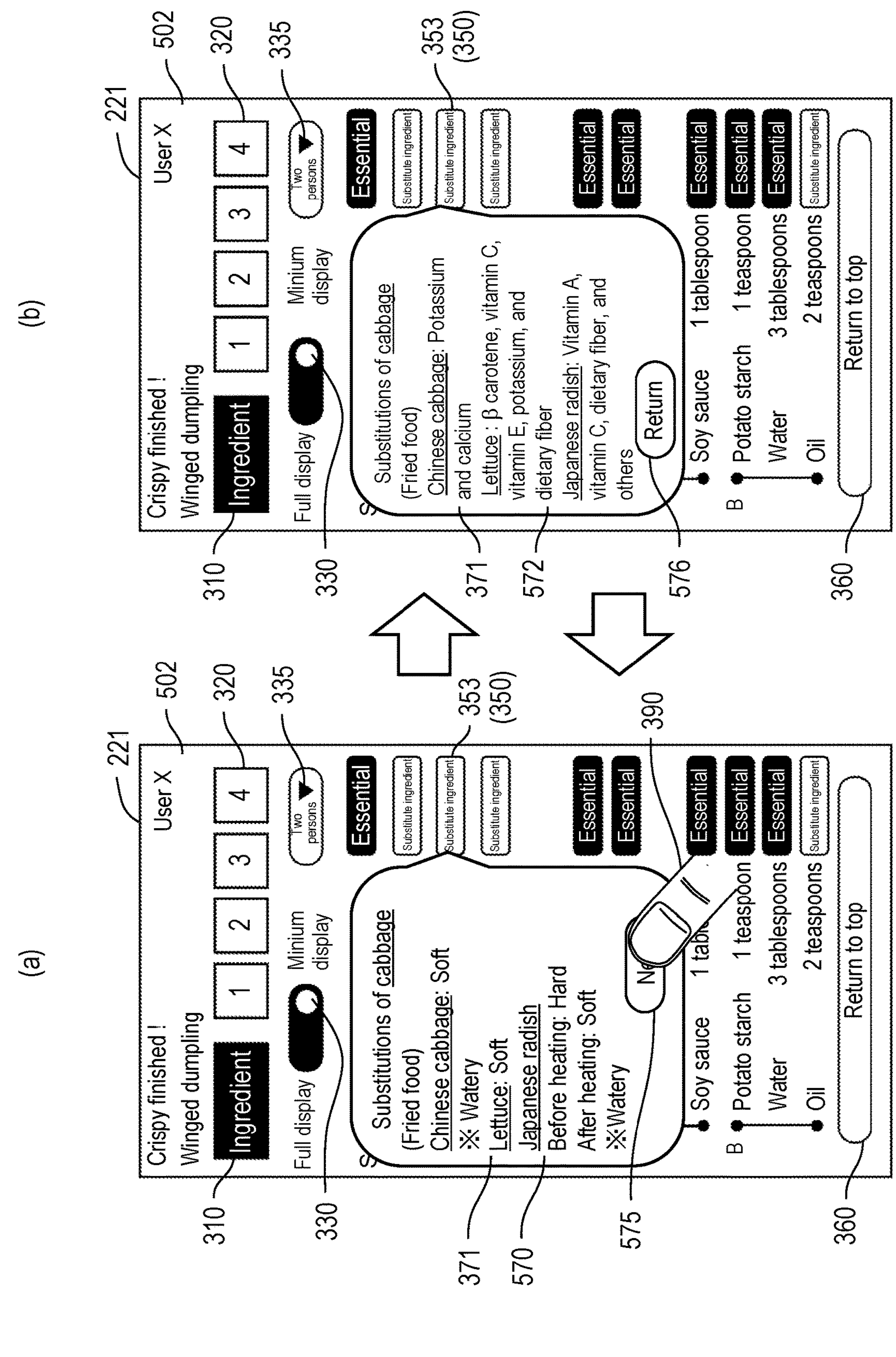
FIG. 19 is a view showing an example of switching the popup display shown in FIG. 18.

FIG. 19 shows an example of switching the popup display shown in FIG. 18. As shown (a) of FIG. 19, when a user selects display switching button 575, substitute list image 572 is displayed instead of substitute list image 570, as shown in (b) of FIG. 19. Substitute list image 572 includes information related to "main nutrients" of substitute ingredient profile table 123*a* as the information indicating characteristics of the ingredient corresponding to ingredient name 371.

Substitute list image 572 also includes display switching button 576. When display switching button 576 is selected, substitute list image 570 shown in (a) of FIG. 19 is displayed. A user performs the above-mentioned selection through selection operation such as tapping (single clicking) or holding down the button.

Herein, the switching between two substitute list images, i.e., substitute list image 570 and substitute list image 572 has been described. However, three or more substitute list images may be employed. The information included in each image is not particularly limited, either.

In the present exemplary embodiment, even if auxiliary information icon 350 other than substitutable icon 353 is selected, predetermined information is displayed. Hereinafter, a display example displayed when another type of auxiliary information icon 350 is selected will be described with reference to FIGS. 20 and 21.

Figure 20:
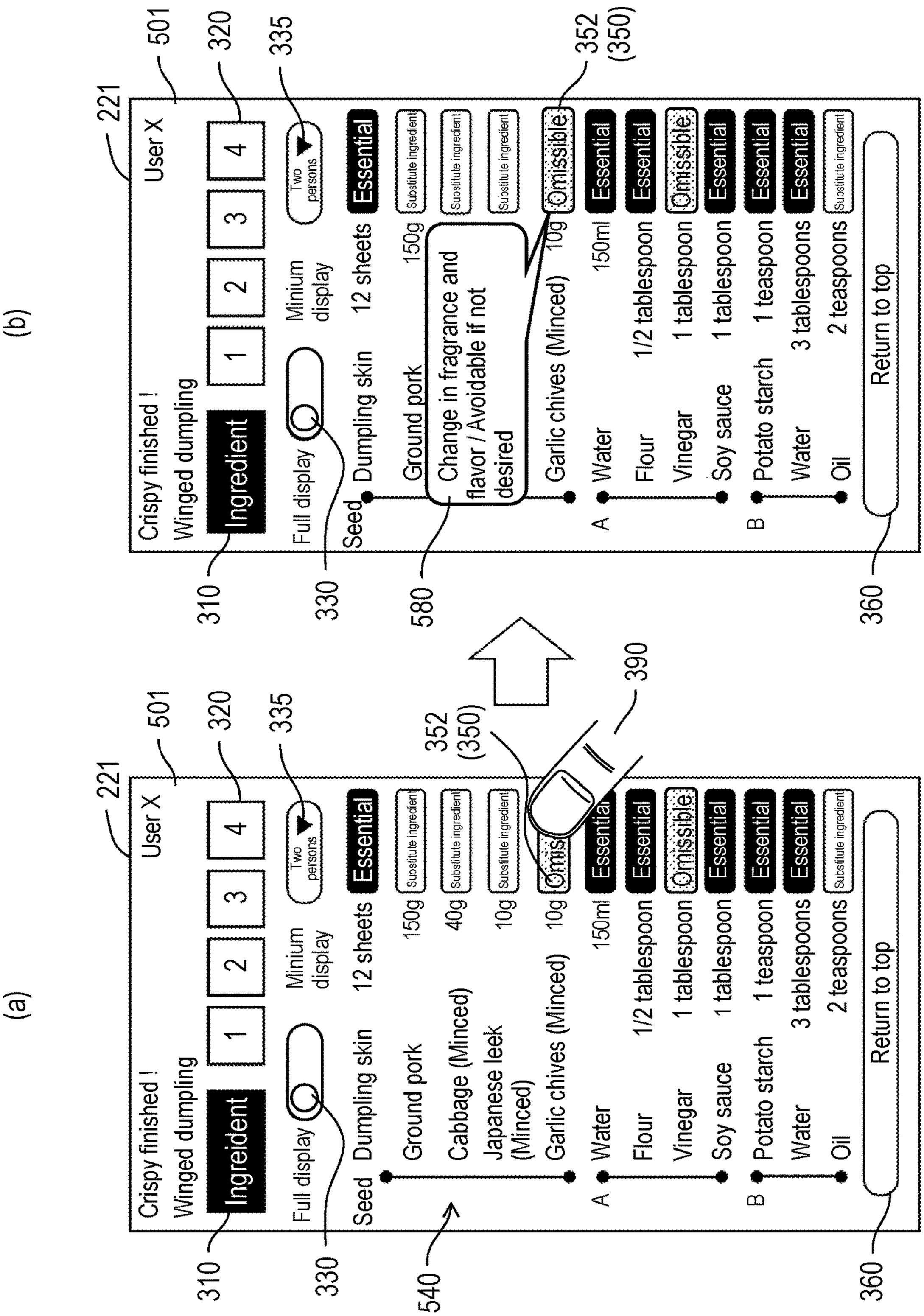
FIG. 20 is a view showing an example of a popup display of an omissible ingredient on the ingredient display image of the cooking recipe in the cooking recipe display system in accordance with the second exemplary embodiment.

FIG. 20 shows an example of a popup display of an omissible ingredient on ingredient display image 501 of a cooking recipe in cooking recipe display system 1*b*. As shown in (a) of FIG. 20, a user selects omissible icon 352 corresponding to "garlic chives," for example. A user performs the above-mentioned selection through selection operation such as holding down or tapping (single clicking) the button.

"Garlic chives" has a necessity of "2." Ingredient profile manager 420 refers to recipe specific ingredient profile table 421 shown in FIG. 15. Ingredient profile manager 420 obtains information related to "influence degree on taste" corresponding to "garlic chives." Thus, based on the obtained information, taste information image 580 is displayed on display screen 221, as shown in (b) of FIG. 20.

Taste information image 580 shows an influence on a cooking taste when the corresponding ingredient is omitted. Taste information image 580, which is a popup display, is superimposed on ingredient display image 501 and displayed. The display of taste information image 580 makes it possible for a user to recognize a difference in taste of dish when the corresponding ingredient is omitted.

Figure 21:
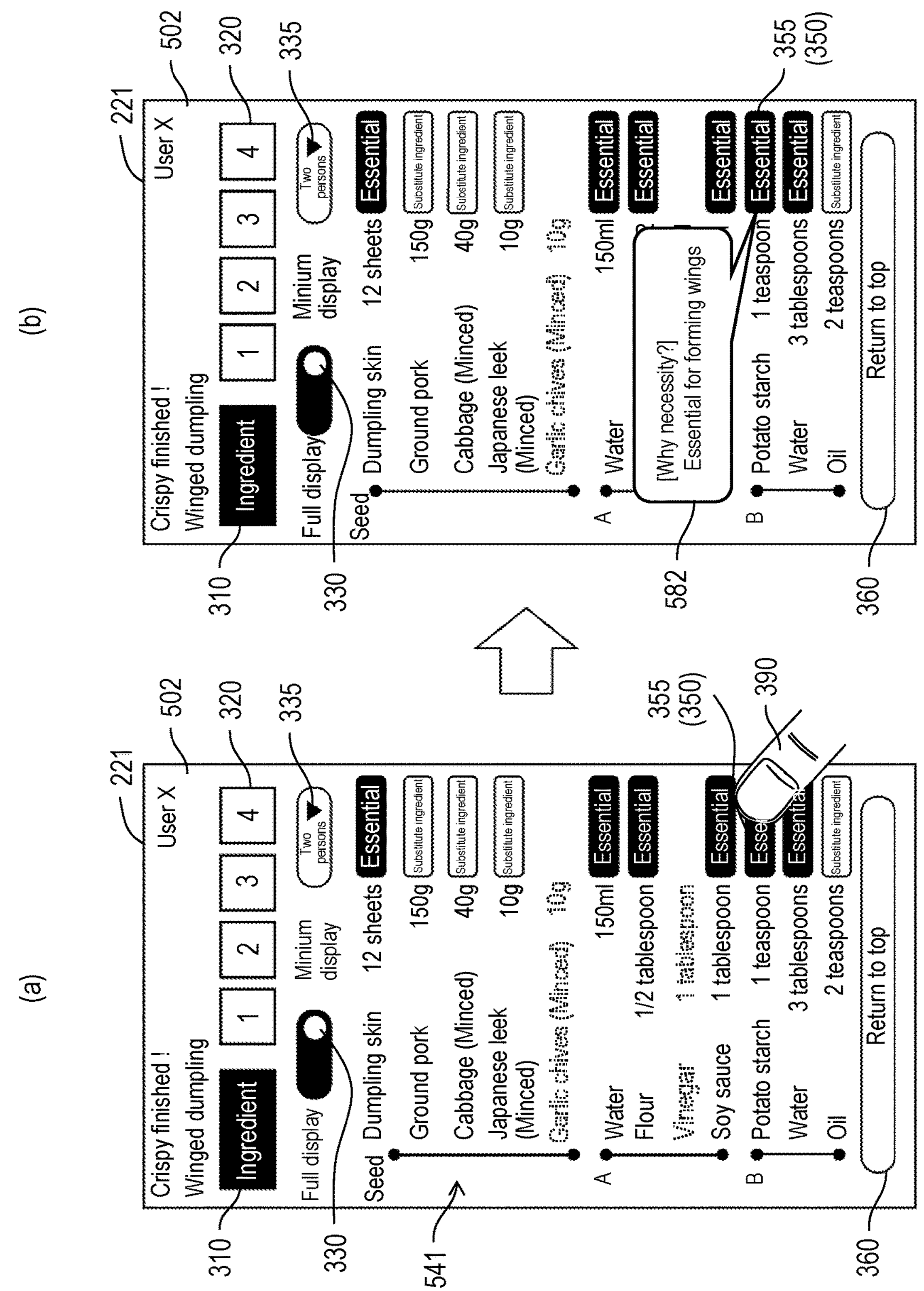
FIG. 21 is a view showing an example of a popup display of an essential ingredient on the ingredient display image of the cooking recipe in the cooking recipe display system in accordance with the second exemplary embodiment.

FIG. 21 shows an example of a popup display of an essential ingredient on ingredient display image 502 of a cooking recipe in cooking recipe display system 1*b*. As shown in (a) of FIG. 21, a user selects essential icon 355 corresponding to "potato starch," for example. A user performs the above-mentioned selection through selection operation such as holding down or tapping (single clicking) the button.

The "potato starch" has a necessity of "5." Ingredient profile manager 420 refers to recipe specific ingredient profile table 421 shown in FIG. 15. Ingredient profile manager 420 obtains information related to "influence degree on taste" corresponding to the "potato starch." Thus, based on the obtained information, taste information image 582 is displayed on display screen 221, as shown in (b) of FIG. 21.

Taste information image 582 shows a reason why the corresponding ingredient is essential. Taste information image 582, which is a popup display, is superimposed on ingredient display image 502 and displayed. The display of taste information image 580 makes it possible to notify a user of the reason why the corresponding ingredient is essential. Thus, a user can be prevented from omitting the above-mentioned ingredient accidentally.

[Additional Remark]

As mentioned above, in cooking recipe display system 1*b* in accordance with the first aspect of the present disclosure, an ingredient having a necessity of a predetermined value or less among all ingredients is displayed thinner than an ingredient having a necessity of more than the predetermined value on a second ingredient display image in a minimum display mode.

Thus, cooking recipe display system 1*b* can cause a user to recognize that an ingredient to be originally used is omissible, while suggesting the ingredient to the user. A user can also prepare an omissible ingredient as necessary. According to cooking recipe display system 1*b*, an arrangement of a cooking recipe can be supported.

Auxiliary information includes omissible information. The omissible information indicates that an ingredient corresponding to the above-mentioned omissible information can be omitted. Controller 210 can receive a selection of the omissible information displayed on display screen 221. When the omissible information is selected, controller 210 displays information, which indicates an influence on a dish when an ingredient corresponding to the above-mentioned omissible information is omitted, on the display screen 221.

This makes it possible to suggest a difference in taste or the like, which is caused when an ingredient having a low necessity is omitted, to a user.

Auxiliary information includes essential information. The essential information indicates that an ingredient corresponding to the above-mentioned essential information is essential. Controller 210 can receive a selection of the essential information displayed on display screen 221. When the essential information is selected, controller 210 displays information, which indicates a reason why an ingredient corresponding to the above-mentioned essential information is essential, on display screen 221.

This makes it possible to notify a user of a reason why the ingredient is essential.

The ingredient profile further indicates an influence degree of each of a plurality of ingredients on a taste for each of a plurality of cooking recipes. Based on the ingredient profile, controller 210 displays taste information, which corresponds to an influence degree of each of the plurality of ingredients on a taste, on display screen 221. Herein, the plurality of ingredients are included in a target recipe.

Thus, auxiliary information corresponding to an influence degree on taste can be displayed on display screen 221, for example. In consideration of the influence degree, a user can determine whether or not to use the ingredient. According to cooking recipe display system 1*b*, an arrangement of a cooking recipe can be supported.

Third Exemplary Embodiment

A third exemplary embodiment of the present disclosure will be described. In the present exemplary embodiment, a different point from the first exemplary embodiment and the second exemplary embodiment will mainly be described, and the description of a common point therebetween will be omitted or simplified.

[Configuration]

Figure 22:
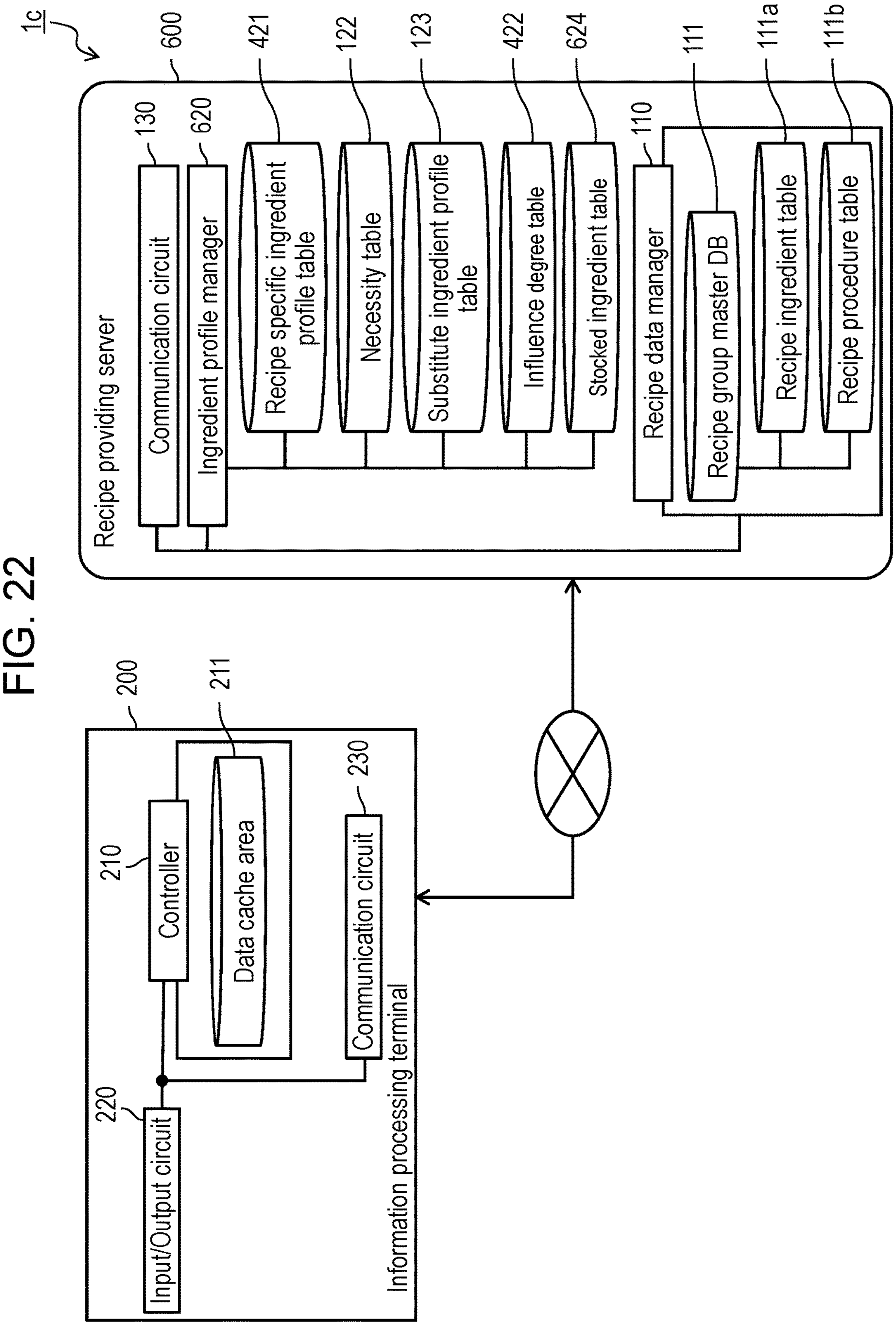
FIG. 22 is a block diagram showing a functional configuration of a cooking recipe display system in accordance with a third exemplary embodiment.

Cooking recipe display system 1*c* in accordance with the present exemplary embodiment has the same schematic configuration as cooking recipe display system 1*a* shown in FIG. 1. FIG. 22 shows a functional configuration of cooking recipe display system 1*c*. As shown in FIG. 22, cooking recipe display system 1*c* includes recipe providing server 600 and information processing terminal 200. Information processing terminal 200 is the same as information processing terminal 200 in accordance with the first exemplary embodiment.

Unlike recipe providing server 400 in accordance with the second exemplary embodiment, recipe providing server 600 includes ingredient profile manager 620 instead of ingredient profile manager 420. Ingredient profile manager 620 manages stocked ingredient table 624, in addition to ingredient profile manager 420 in accordance with the second exemplary embodiment.

Stocked ingredient table 624 retains stock information indicating a storage situation of each of a plurality of ingredients. Stocked ingredient table 624 retains stock data related to ingredients stocked by a user as the stock information.

FIG. 23 shows an example of stocked ingredient table 624. As shown in FIG. 23, the stock data retained in stocked ingredient table 624 includes information related to "stock ID," "ingredient name," "ingredient ID," "genre," "consumption period," and "elapsed period." The "ingredient name" and the "ingredient ID" are the same as the ones included in recipe ingredient table 111*a*.

The "stock ID" indicates identification information for managing a stocked ingredient. The "genre" indicates a classification of an ingredient. The "genre" is synonymous with "ingredient classification" of recipe specific ingredient profile table 421. The "consumption period" indicates the number of days of a period in which an ingredient can be consumed appropriately. In other word, the "consumption period" indicates the number of days from a production date to a consumption expiration date of the ingredient.

A consumption expiration date may be indicated instead of the "consumption period." The "elapsed period" indicates the number of days elapsed after an ingredient is registered in stocked ingredient table 624. The "elapsed period" may be the number of days elapsed from a production day of the ingredient.

For instance, a user inputs information on the stocked ingredients through input/output circuit 220 of information processing terminal 200, thereby generating stocked ingredient table 624 for each stock ID. For instance, a user inputs an ingredient name, a production day, and a consumption expiration date of an ingredient.

Thus, ingredient profile manager 620 assigns a stock ID, an ingredient ID, and a genre to the inputted ingredient. Ingredient profile manager 620 calculates a consumption period based on the production day and the consumption expiration date, and then starts counting an elapsed period.

The elapsed period is updated automatically. A user may input only an ingredient name of an ingredient. Ingredient profile manager 620 may register a predetermined consumption period for each ingredient.

A user may photograph an ingredient using a camera or the like instead of inputting an ingredient name. By analyzing the obtained image, ingredient profile manager 620 may generate an ingredient name or the like, automatically. Ingredient profile manager 620 may cooperate with a refrigerator, a freezer, an ingredients storage, or the like to generate stocked ingredient table 624 automatically.

Specific Display Example

In cooking recipe display system 1*c*, a specific example of the display image displayed on display screen 221 will be described.

Cooking recipe display system 1*c* is different in display contents, which are displayed when substitutable icon 353 is selected, from cooking recipe display system 1*b*.

Figure 24:
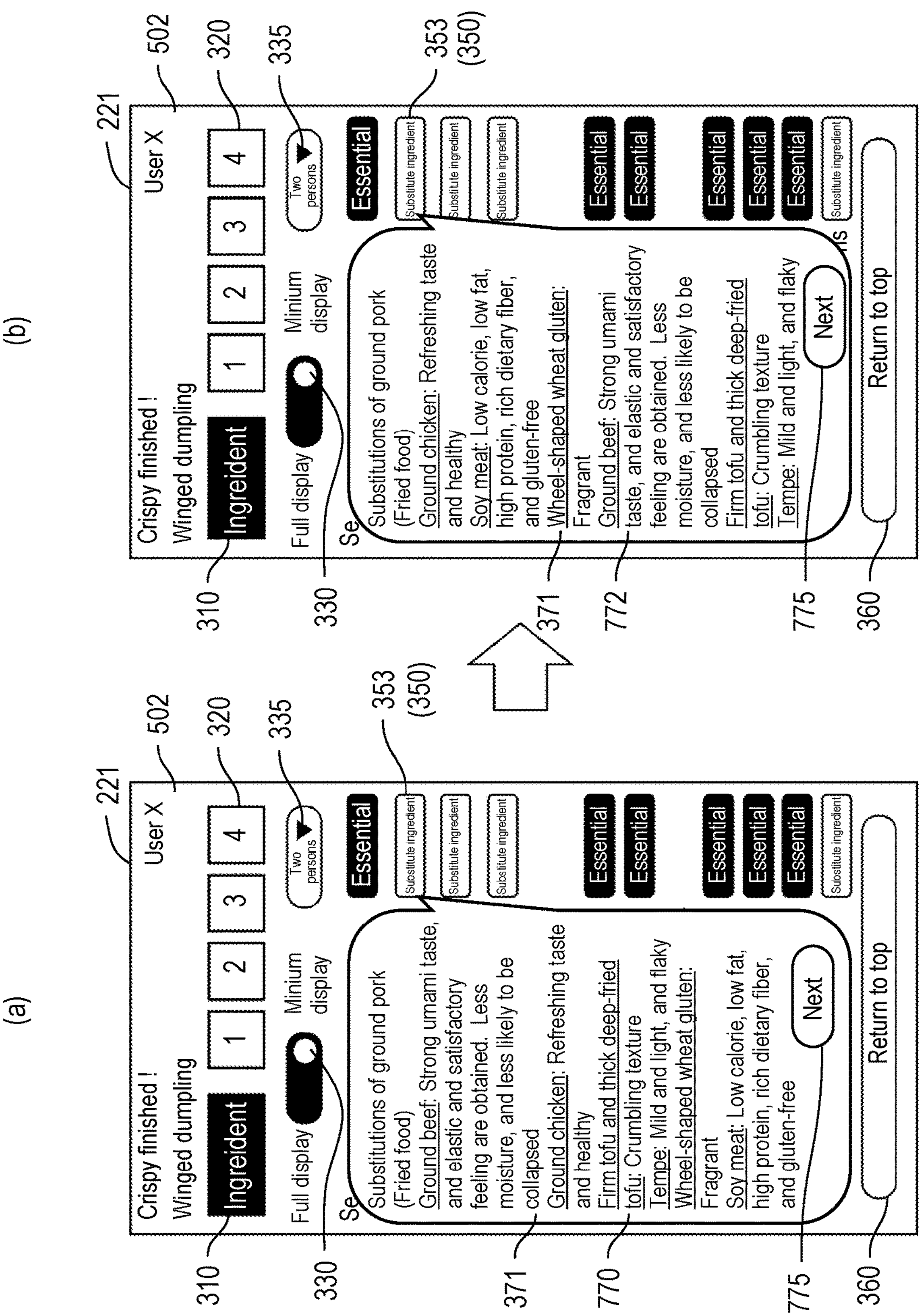
FIG. 24 is a view showing an example of an ingredient list of a popup display of substitute ingredients on an ingredient display image of a cooking recipe in the cooking recipe display system in accordance with the third exemplary embodiment.

FIG. 24 shows an example of an ingredient list of a popup display of substitute ingredients on ingredient display image 502 of a cooking recipe in cooking recipe display system 1*c*. When substitutable icon 353 of "ground pork" is selected in (a) of FIG. 24, substitute list image 770 related to "ground pork" is displayed.

"Ground pork" is an unrestricted ingredient having a necessity of "3" (see recipe specific ingredient profile table 421 of FIG. 15). Ingredient profile manager 620 refers to unrestricted substitute-ingredient profile table 123*b* shown in FIG. 9 to specify that a group to which "ground pork" belongs is "G2."

Thus, as shown in (a) of FIG. 24, substitute list image 770, which includes ingredient names 371 such as "ground beef" and "ground chicken," is displayed as a substitute ingredient of "ground pork."

Substitute list image 770 includes display switching button 775. When a user selects display switching button 775, display contents of substitute list image 770 is switched. In the present exemplary embodiment, the display order of substitute ingredients is changed based on contents of stocked ingredient table 624.

Specifically, as shown in (b) of FIG. 24, substitute list image 772 in which the display order of substitute ingredients is different is displayed. In substitute list image 772, the display order of ingredient names 371 of substitute ingredients is determined based on a consumption period and an elapsed period of stocked ingredient table 624. Specifically, ingredient names 371 are arranged in ascending order of differences between a consumption period and an elapsed period, i.e., in the order of ingredients needed to be consumed earlier.

For instance, among substitute ingredients included in substitute list image 770, the ingredients retained in stocked ingredient table 624 are "ground chicken," "wheel-shaped wheat gluten," and "soy meat." The differences between a consumption period and an elapsed period of "Ground chicken," "wheel-shaped wheat gluten," and "soy meat" are 20 days, 300 days, and 245 days, respectively.

Therefore, in the substitute list image 772 shown in (b) of FIG. 24, ingredient names 371 are arranged in ascending order of differences between a consumption period and an elapsed period. Specifically, ingredient names 371 are arranged in this order, i.e., "ground chicken," "soy meat," and "wheel-shaped wheat gluten." "Ground beef," "firm tofu and thick deep-fried tofu," and "tempe," which are not retained in stocked ingredient table 624, are arranged after "wheel-shaped wheat gluten."

Thus, ingredients stocked by a user and especially, among the stocked ingredients, ingredients need to be consumed earlier are displayed preferentially. As a result, consumption of ingredients can be promoted.

Herein, stocked ingredients are preferentially displayed according to the display order. However, the present disclosure is not limited to this. For instance, ingredient names of stocked ingredients may be displayed in a bold letter, or a character color thereof may be changed to highlight the ingredient names.

[Additional Remark]

As mentioned above, in cooking recipe display system 1*c* in accordance with the first aspect of the present disclosure, ingredient profile manager 620 further manages stock information indicating a storage situation of each of a plurality of ingredients. Controller 210 generates a list of substitute ingredients based on the stock information, and displays the list of substitute ingredients on a display screen.

Thus, ingredients stocked by a user can be used more efficiently.

Fourth Exemplary Embodiment

A fourth exemplary embodiment of the present disclosure will be described. In the present exemplary embodiment, a different point from the first embodiment through the third exemplary embodiment will mainly be described, and the description of a common point therebetween will be omitted or simplified.

[Configuration]

Figure 25:
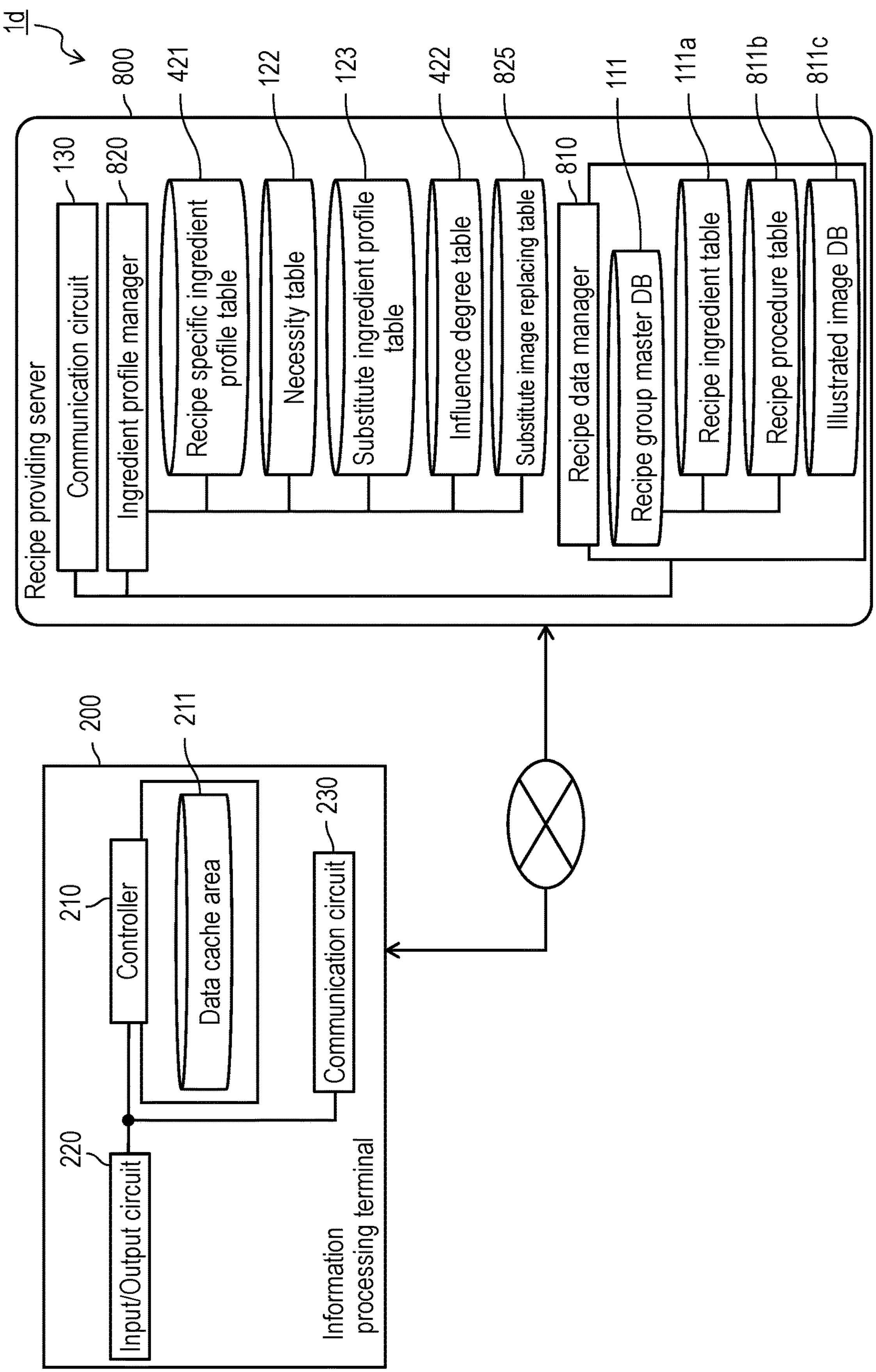
FIG. 25 is a block diagram showing a functional configuration of a cooking recipe display system in accordance with a fourth exemplary embodiment.

Cooking recipe display system 1*d* in accordance with the present exemplary embodiment has the same schematic configuration as cooking recipe display system 1*a* shown in FIG. 1. FIG. 25 shows a functional configuration of cooking recipe display system 1*d*. As shown in FIG. 25, cooking recipe display system 1*d* includes recipe providing server 800 and information processing terminal 200. Information processing terminal 200 is the same as information processing terminal 200 in accordance with the first exemplary embodiment.

Recipe providing server 800 includes recipe data manager 810 and ingredient profile manager 820. Recipe data manager 810 manages recipe group master DB 111, recipe ingredient table 111*a*, recipe procedure table 811*b*, and illustrated image DB 811*c*.

Recipe procedure table 811*b* retains information related to one or more procedures of the dish for each cooking recipe, like recipe procedure table 111*b*. Recipe procedure table 811*b* has a configuration for changing a natural language sentence indicating a procedure, when a substitute ingredient is used or the like.

FIG. 26 shows an example of recipe procedure table 811*b* related to a recipe ID of "R001," i.e., "winged dumpling: two servings." As shown in FIG. 26, the procedure data, which is retained in recipe procedure table 811*b*, retains information related to "procedure number," "display procedure," "internal configuration," "parameter value," and "substitute value."

The "display procedure" shown in FIG. 26 is a natural language sentence constituted by a combination of the "internal configuration" and the "parameter value." The "display procedure" is a sentence that is displayed on display screen 221 and indicates a procedure of a cooking recipe.

In the "internal configuration," terms such as an ingredient, an amount, a utensil, and cooking operation, which constitute a procedure of a cooking recipe, are expressed by <identification word>. The <identification word> is replace by a term interposed between <identification word> and </identification word>, which are defined in the "parameter value." The identification word is expressed by a combination of characters and numbers that indicate classification such as an ingredient, an amount, a utensil, and cooking operation.

The <identification word> can be replaced by a term defined in the "substitute value." For instance, in the first procedure, "lettuce" can be used instead of "cabbage" of ingredient 1. In the second procedure, "ground chicken" can be used instead of "ground pork" of ingredient 8.

By adding, correcting, and deleting a term to and from the "substitute value," an ingredient, an amount, a utensil, cooking operation, or the like can be changed and displayed, while a skeleton of the cooking procedure in a cooking recipe is maintained.

Illustrated image DB 811*c* retains a data file of illustrated images as an image representing each work content in a plurality of procedures for each cooking recipe.

FIG. 27 shows an example of illustrated image DB 811*c* related to a recipe ID of "R001," i.e., "winged dumpling: two servings." As shown in FIG. 27, in illustrated image DB 811*c*, "related image" displayed for each procedure is associated with one or more "drawing-image designations for an individual image" which constitute the "related image" for each cooking recipe.

The "drawing-image designation for an individual image" includes layout information that specifies a size and an arrangement of each of one or more individual images. By adjusting a size and an arrangement of the individual image according to the layout information, the related image can be displayed on display screen 221. The "drawing-image designation for an individual image" includes image data, a file name, address information on a reference destination, or the like, for example.

As an image recalling a dish that is made based on a cooking recipe, illustrated image DB 811*c* may retain a data file of illustrated images.

Ingredient profile manager 820 manages substitute-image replacing table 825 in addition to ingredient profile manager 420 in accordance with the second exemplary embodiment. Substitute-image replacing table 825 retains substitute image information that is used instead of an illustrated image. Substitute-image replacing table 825 retains substitute image data as an example of substitute image information.

FIG. 28 shows an example of substitute-image replacing table 825. As shown in FIG. 28, the substitute image data, which is retained in substitute-image replacing table 825, include information related to "substitute ID," "category," "starting point ingredient," "substitute ingredient (ingredient ID)," and "individual image." The "substitute ID," "category," and "substitute ingredient" each are the same as the items included in substitute ingredient profile table 123*a*.

The "starting point ingredient" shows an individual image representing an ingredient that serves as a starting point when an ingredient to be used is changed. The "individual image" indicates an individual image of a substitute ingredient. The individual image includes a file name of the image data. The individual image may also include address information on a reference destination.

Specific Display Example

In cooking recipe display system 1*d*, a specific example of the display image displayed on display screen 221 will be described.

Figure 29:
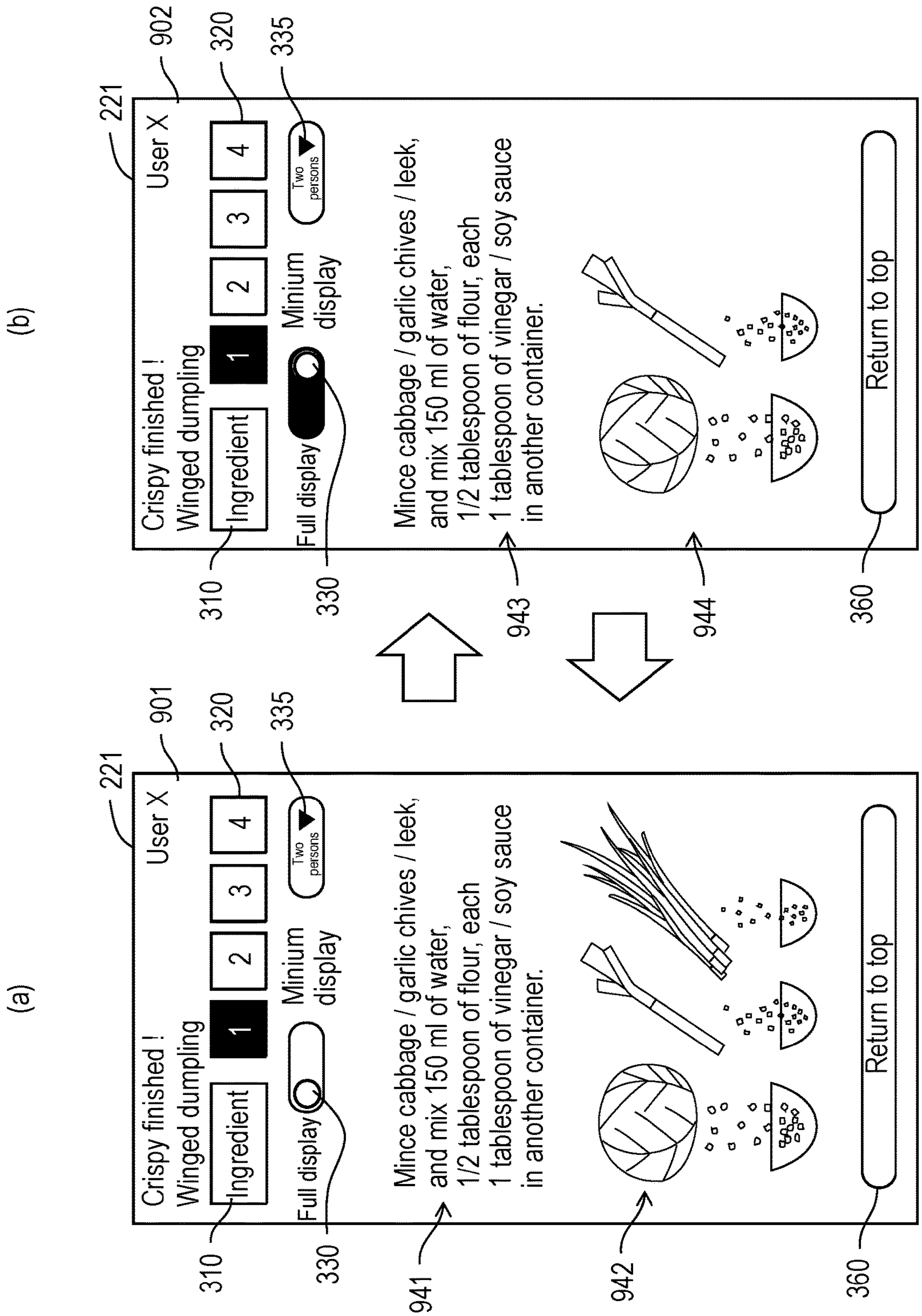
FIG. 29 is a view showing a first example of a procedure display image of a cooking recipe in the cooking recipe display system in accordance with the fourth exemplary embodiment.

FIG. 29 shows a first example of a procedure display image of a cooking recipe in cooking recipe display system 1*d*. In (a) of FIG. 29, procedure display image 901 in a full display mode is shown. In (b) of FIG. 29, procedure display image 902 in a minimum display mode is shown.

Controller 210 of information processing terminal 200 generates procedure display images 901 and 902, and displays them on display screen 221. Controller 210 generates procedure display images 901 and 902 based on the information that is transmitted from recipe providing server 800 through communication circuit 130 and received through communication circuit 230.

A controller (not shown) of recipe providing server 800 may generate procedure display images 901 and 902 and transmit them to information processing terminal 200 through communication circuit 130.

In FIG. 29, procedure display images 901 and 902 are shown as an example. Procedure display images 901 and 902 are images displayed when a recipe ID of "R001," i.e., "winged dumpling" is selected as a target recipe.

For instance, when procedure selection button 320 of "1" is selected in ingredient display image 501 shown in (a) of FIG. 17, procedure display image 901 shown in (a) of FIG. 29 is displayed. For instance, when procedure selection button 320 of "1" is selected in ingredient display image 502 shown in (b) of FIG. 17, procedure display image 902 shown in (b) of FIG. 29 is displayed.

Procedure display image 901 and procedure display image 902 can be switched to each other by sliding display switching button 330. When ingredient display button 310, which is included in procedure display image 901 or procedure display image 902, is selected, ingredient display image 501 or ingredient display image 502 shown in FIG. 17 is displayed.

In this way, the procedure display image and the ingredient display image can be switched to each other, and in each display image, a switching between a full display mode and a minimum display mode is also made possible.

As shown in (a) of FIG. 29, procedure display image 901 in a full display mode is an example of a first procedure display image indicating a target procedure, which is one of one or more procedures indicated by a target recipe. Procedure display image 901 includes display procedure 941 and illustrated image 942.

Display procedure 941, which is a natural language sentence that indicates the selected cooking procedure (herein, the first procedure), is obtained by referring to recipe procedure table 811*b* in FIG. 26. Illustrated image 942, which is a related image of the selected cooking procedure, is obtained by referring to illustrated image DB 811*c*.

As shown in (b) of FIG. 29, procedure display image 902 in a minimum display mode is an example of a second procedure display image. For at least one part of a plurality of ingredients, a display mode of the second procedure display image is different from a display mode of the first procedure display image, depending on a necessity of the above-mentioned ingredient. Herein, the plurality of ingredients are included in the target procedure. In procedure display image 902, a display of the ingredient having a necessity of the predetermined value (e.g., "2") or less is omitted.

Specifically, procedure display image 902 includes display procedure 943 and illustrated image 944. Unlike display procedure 941 shown in (a) of FIG. 29, "garlic chives" and "vinegar" are omitted in display procedure 943.

"Garlic chives" and "vinegar" are omissible ingredients having a necessity of "2" (see recipe specific ingredient profile table 421 of FIG. 15). Therefore, the image representing "garlic chives" is omitted in illustrated image 944. The way how to specify the ingredient having a necessity of the predetermined value or less is the same as in the first exemplary embodiment.

In this way, in the minimum display mode, a display related to omissible ingredients is removed from the natural language sentence and the illustrated image of the display procedure. Thus, only an ingredient to be used can be suggested to a user. This makes it possible to suggest necessary and sufficient information, without confusing a user who tries to make a dish using minimum ingredients.

A display mode of the procedure display image in a minimum display mode is not limited to the example shown in (b) of FIG. 29. Hereinafter, another example of the procedure display image in a minimum display mode will be described with reference to FIGS. 30 and 31.

Figure 30:
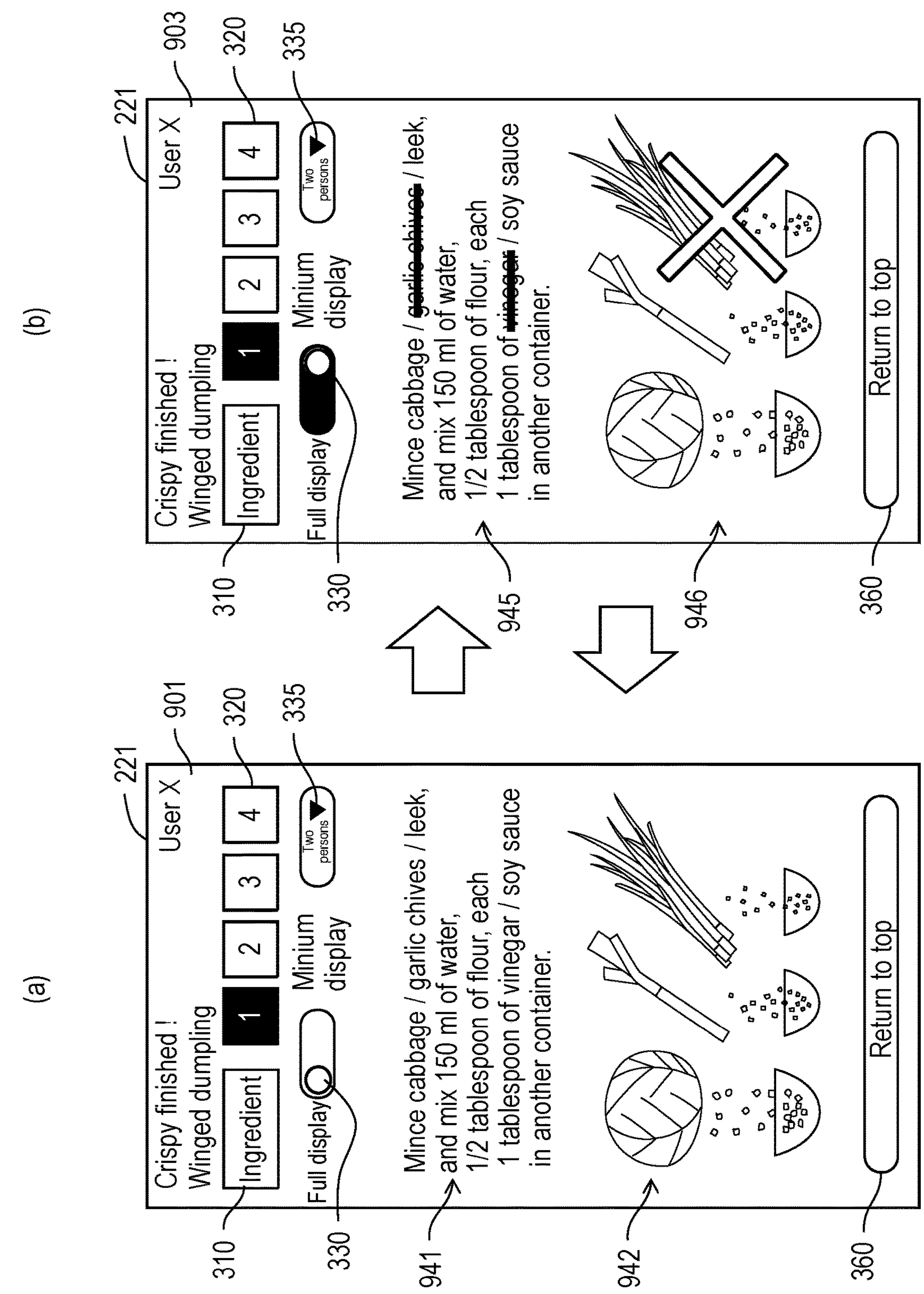
FIG. 30 is a view showing a second example of the procedure display image of the cooking recipe in the cooking recipe display system in accordance with the fourth exemplary embodiment.

FIG. 30 shows a second example of a procedure display image of a cooking recipe in cooking recipe display system 1*d*. In (a) of FIG. 30, procedure display image 901 in a full display mode, which is the same as the image shown in (a) of FIG. 29, is shown. In (b) of FIG. 30, procedure display image 903 in a minimum display mode is shown.

As shown in (b) of FIG. 30, in the minimum display mode of procedure display image 903, an ingredient having a necessity of a predetermined value or less is displayed with a strikethrough line. Specifically, in display procedure 945 of procedure display image 903, a strikethrough line is given to "garlic chives" and "vinegar" both having a necessity of "2."

In illustrated image 946, an X-shaped strikethrough line is given to the image representing "garlic chives." A type, thickness, a color, a shape, and the like of the strikethrough line are not particularly limited. It is enough that an ingredient having a low necessity can be distinguished visually with ease.

Figure 31:
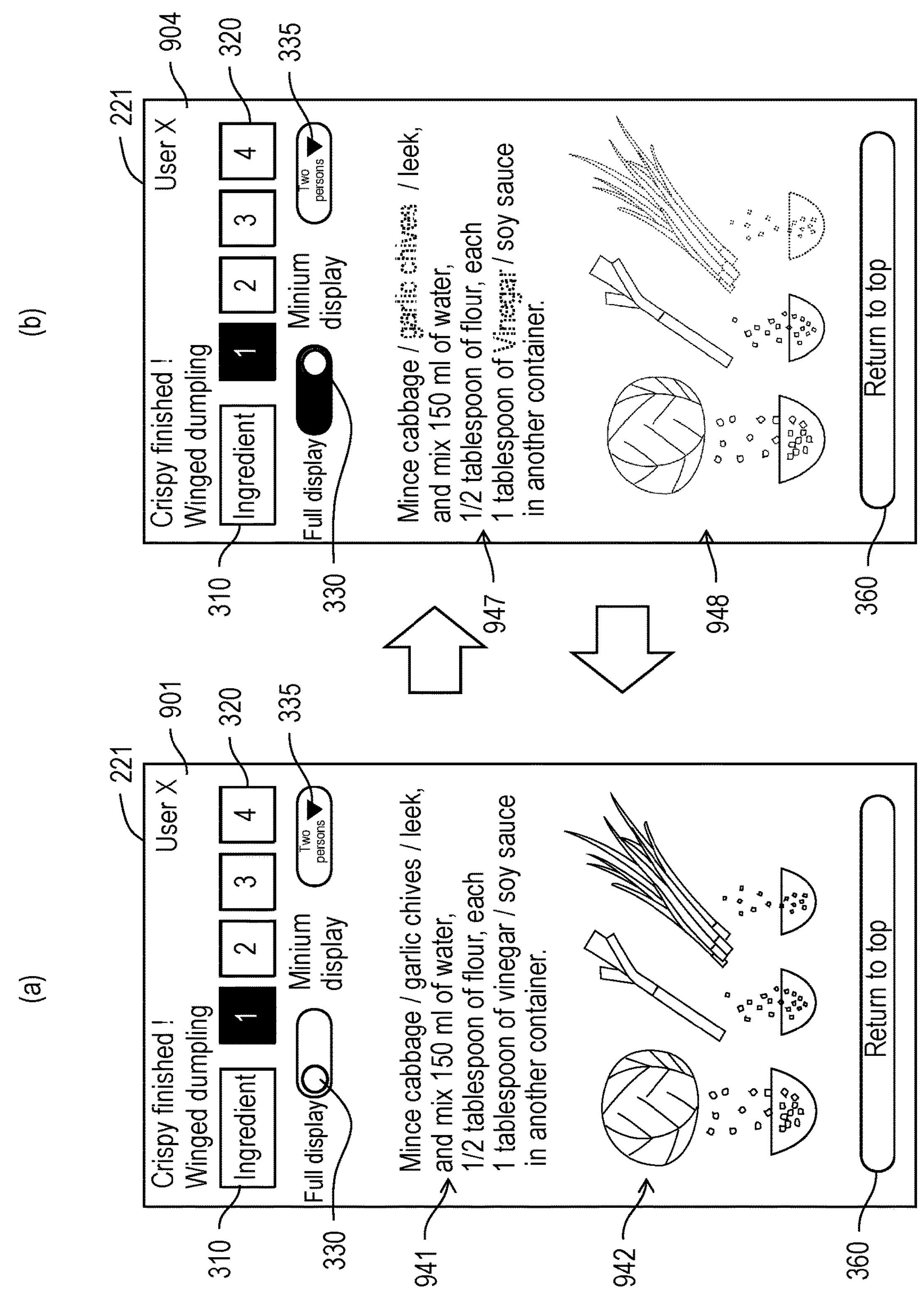
FIG. 31 is a view showing a third example of the procedure display image of the cooking recipe in the cooking recipe display system in accordance with the fourth exemplary embodiment.

FIG. 31 shows a third example of a procedure display image of a cooking recipe in cooking recipe display system 1*d*. In (a) of FIG. 31, procedure display image 901 in a full display mode, which is the same as the image shown in (a) of FIG. 29, is shown. In (b) of FIG. 31, procedure display image 904 in a minimum display mode is shown.

In the minimum display mode of procedure display image 904, an ingredient having a necessity of a predetermined value or less is displayed thinner than an ingredient having a necessity of more than the predetermined value. For instance, the necessities of "garlic chives" and "vinegar" are lower than those of the other ingredients. Therefore, the ingredient names of "garlic chives" and "vinegar" are displayed thinner than those of the others in display procedure 947, as shown in (b) of FIG. 31. Similarly, the image representing "garlic chives" is displayed thinner than that of the others in illustrated image 948.

Using a method other than a color shade of characters, the minimum display mode may be visualized to differ from the full display mode. For instance, in the minimum display mode, a dotted line may be used to display a character and an image. Alternatively, a character and an image may be displayed in a blinking manner.

In this way, the omitted ingredients can be suggested to a user in the minimum display mode. Any of the two or more types of procedure display images, mentioned above, may be displayed according to a user's selection, or one type of procedure display image, which is set in advance by a user, may be displayed.

In the present exemplary embodiment, when a substitute ingredient is selected, display contents of a procedure display image are changed. Hereinafter, the display contents of a procedure display image, which are changed when a substitute ingredient is selected, will be described.

Figure 32:
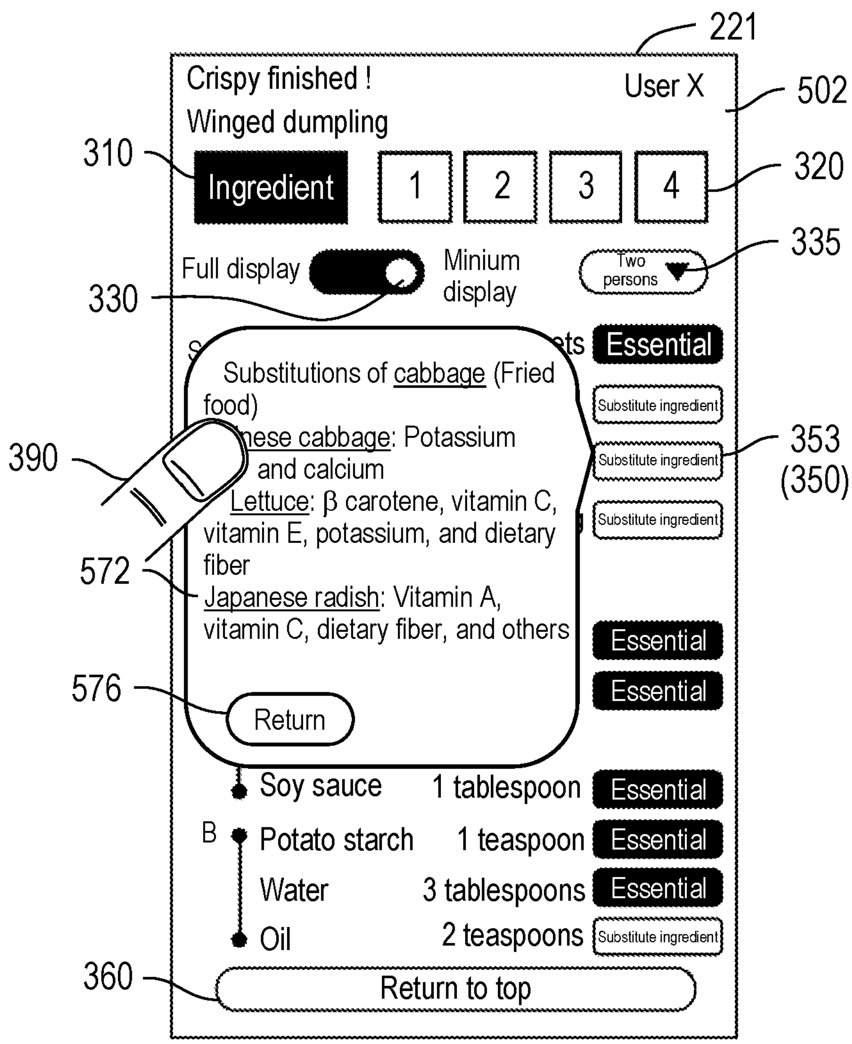
FIG. 32 is a view showing an example of an ingredient list of a popup display of substitute ingredients on the ingredient display image.

FIG. 32 shows an example of an ingredient list of a popup display of substitute ingredients on ingredient display image 502 related to a recipe ID of "R001," i.e., "winged dumpling: two servings." Ingredient display image 502 and substitute list image 572, which are shown in FIG. 32, are the same as the image shown in (b) of FIG. 19. FIG. 32 shows that "Chinese cabbage" is selected as the substitute ingredient of "cabbage."

Figure 33:
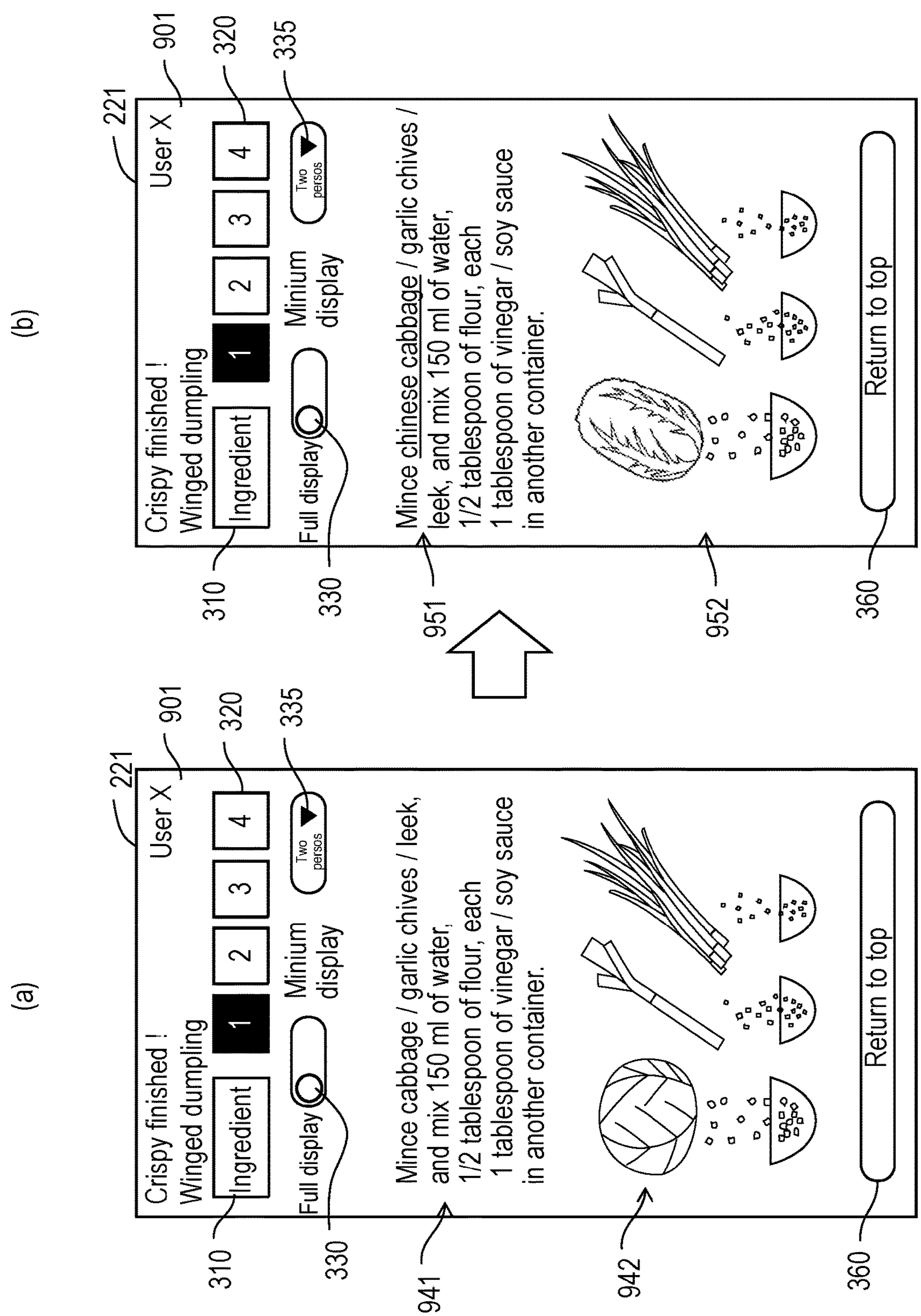
FIG. 33 is a view showing an example of a procedure display image (in a full display mode) on which a substitute ingredient, which is selected in the popup display shown in FIG. 32, is reflected.

FIG. 33 shows an example of a procedure display image on which the substitute ingredient, which is selected in the popup display shown in FIG. 32, is reflected. In (a) of FIG. 33, procedure display image 901 in a full display mode, which is the same as the image shown in (a) of FIG. 29, is shown. In (b) of FIG. 33, procedure display image 901 in a full display mode when "Chinese cabbage" is selected instead of "cabbage" is shown.

As shown in (b) of FIG. 33, "Chinese cabbage" is displayed on display procedure 951 of procedure display image 901 instead of "cabbage." Herein, by underlining "Chinese cabbage," it is indicated that a substitute ingredient has been used. However, other than the underline, i.e., by changing a character color, a size, a character style, or the like, it may be indicated that a substitute ingredient has been used.

Illustrated image 952 includes an image representing "Chinese cabbage" instead of an image representing "cabbage." The replacement of such images is performed with reference to substitution image replacing table 825 shown in FIG. 28.

Figure 34:
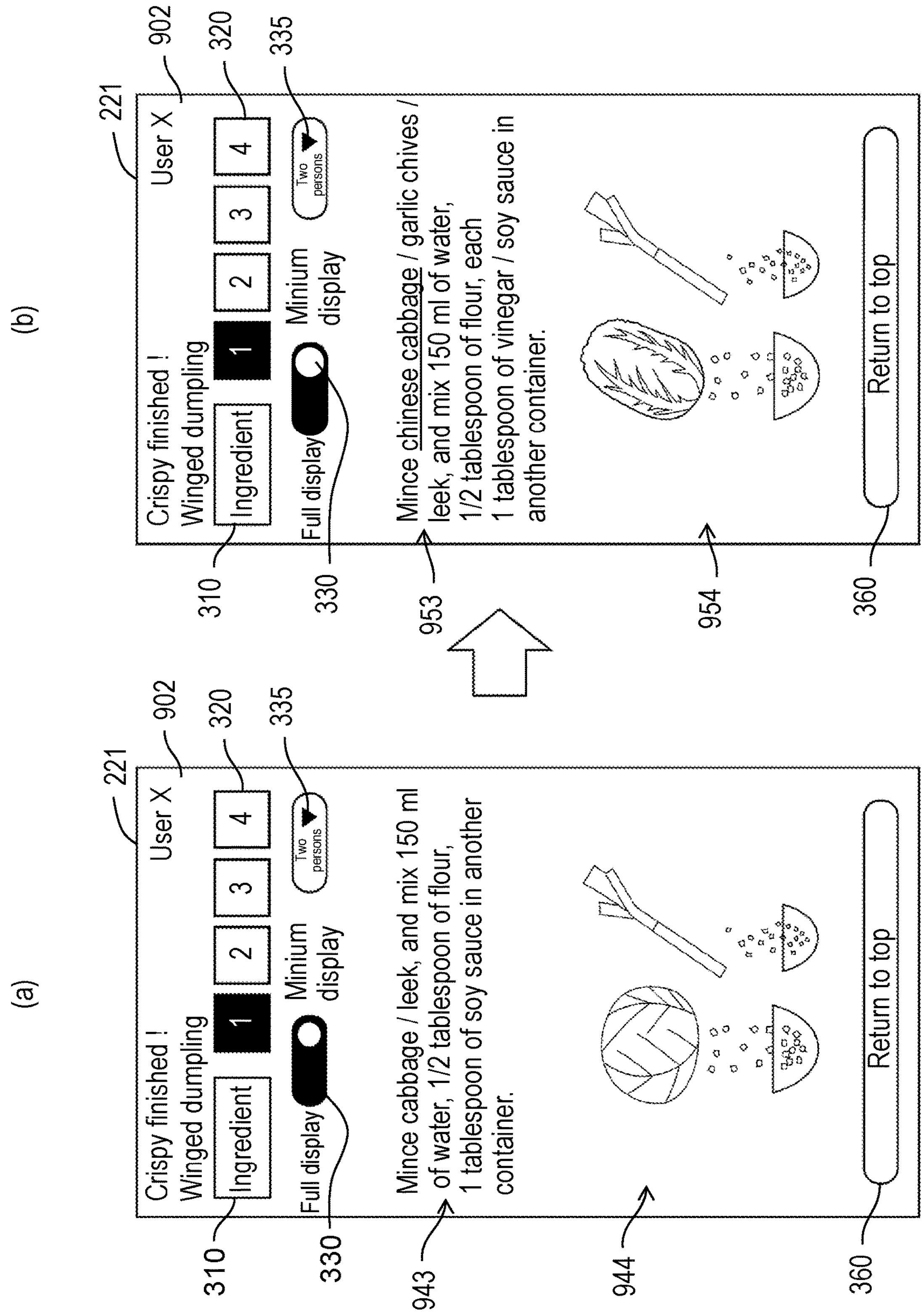
FIG. 34 is a view showing an example of a procedure display image (in a minimum display mode) on which a substitute ingredient, which is selected in the popup display shown in FIG. 32, is reflected.

FIG. 33 shows an example of procedure display image 901 in a full display mode. However, the case of procedure display image 902 in a minimum display mode is also the same. FIG. 34 shows an example of a procedure display image on which the ingredient, which is selected in the popup display shown in FIG. 32, is reflected.

In (a) of FIG. 34, procedure display image 902 in a minimum display mode, which is the same as the image shown in (b) of FIG. 29, is shown. In (b) of FIG. 34, procedure display image 902 in a minimum display mode when "Chinese cabbage" is selected instead of "cabbage" is shown.

As shown in (b) of FIG. 34, "Chinese cabbage" is displayed in display procedure 953 of procedure display image 902 instead of "cabbage."

Illustrated image 954 includes an image representing "Chinese cabbage" instead of an image representing "cabbage." The replacement of such images is performed with reference to substitution image replacing table 825 shown in FIG. 28.

In procedure display image 901 or procedure display image 902, a display procedure and an illustrated image each include an ingredient name and an image of a substitute ingredient. If the character and the image of "cabbage" are displayed in spite of selecting "Chinese cabbage" as a substitute ingredient, a user will likely to be confused. The present exemplary embodiment can suggest a cooking procedure to a user in a clarifying way, without confusing a user.

[Additional Remark]

As mentioned above, in cooking recipe display system 1*d* in accordance with the first aspect of the present disclosure, controller 210 further generates a first procedure display image (e.g., full display mode) and a second procedure display image (e.g., minimum display mode). The first procedure display image and the second procedure display image, which are switched by controller 210, are displayed on display screen 221.

The first procedure display image indicates a target procedure which is one of procedures indicated by a target recipe. For at least one part of a plurality of ingredients included in the target procedure, a display mode of the second procedure display image is different from that of the first procedure display image, depending on a necessity of the corresponding ingredient.

Thus, the full display mode and the minimum display mode can be switched to each other according to an ingredient prepared by a user, thereby making it possible to improve user's convenience.

In the second procedure display image, a display of an ingredient having a necessity of a predetermined value or less is omitted.

Thus, a display of an unnecessary ingredient is omitted, thereby reducing an amount of information on display screen 221. This makes it easy for a user to see display screen 221 and thereby recognize the information. For instance, the omitted ingredient is not displayed, thereby making it possible to prevent a user's confusion.

In the second procedure display image, an ingredient having a necessity of a predetermined value or less may be displayed with a strikethrough line. For instance, in the second procedure display image, an ingredient having a necessity of a predetermined value or less may be displayed thinner than an ingredient having a necessity of more than the predetermined value.

This makes it possible to present an ingredient, which will be used if an original cooking recipe is performed, to a user. Accordingly, a user can prepare the omitted ingredient as necessary, and can also use it for cooking. In this way, according to cooking recipe display system 1*d*, an arrangement of cooking recipe can be supported.

Controller 210 replaces an ingredient, which is included in the first procedure display image or the second procedure display image, with a substitute ingredient substitutable for the above-mentioned ingredient, and displays it.

Thus, since a procedure display image after selection of the substitute ingredient is displayed, ingredient confusion can hardly be caused when a user cooks a dish.

Fifth Exemplary Embodiment

A fifth exemplary embodiment of the present disclosure will be described. In the present exemplary embodiment, a different point from the first exemplary embodiment through the fourth exemplary embodiment will mainly be described, and the description of a common point therebetween will be omitted or simplified.

[Configuration]

Figure 35:
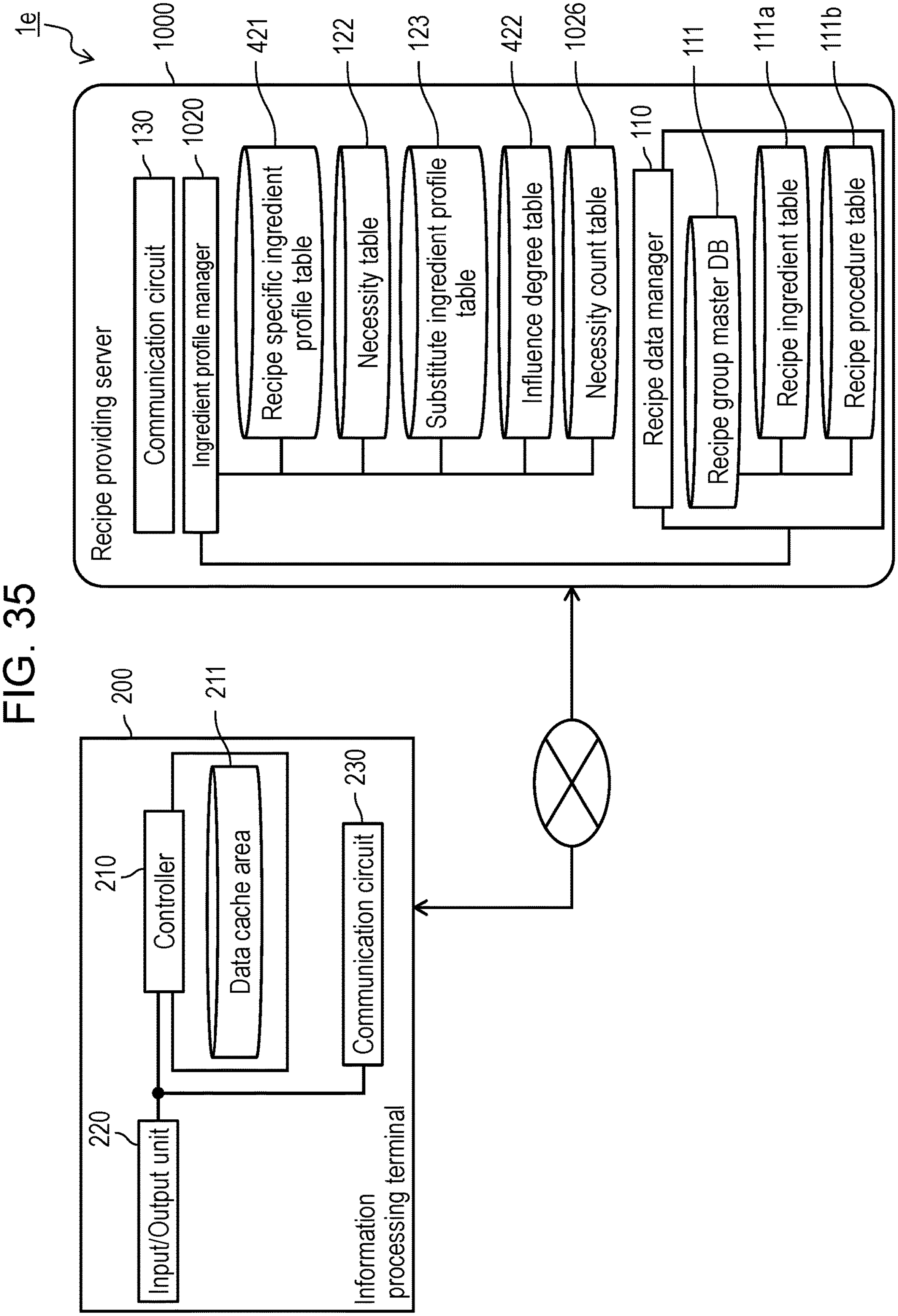
FIG. 35 is a block diagram showing a functional configuration of a cooking recipe display system in accordance with a fifth exemplary embodiment.

Cooking recipe display system 1*e* in accordance with the present exemplary embodiment has the same schematic configuration as in cooking recipe display system 1*a* shown in FIG. 1. FIG. 35 shows a functional configuration of cooking recipe display system 1*e*. As shown in FIG. 35, cooking recipe display system 1*e* includes recipe providing server 1000 and information processing terminal 200. Information processing terminal 200 is the same as information processing terminal 200 in accordance with the first exemplary embodiment.

Unlike recipe providing server 400 in accordance with the second exemplary embodiment, recipe providing server 1000 includes ingredient profile manager 1020 instead of ingredient profile manager 420. Ingredient profile manager 1020 manages necessity count table 1026 in addition to ingredient profile manager 420 in accordance with the second exemplary embodiment.

Necessity count table 1026 retains necessity count information in which the number of ingredients, which are included in one cooking recipe among a plurality of cooking recipes, for each necessity is associated with the one cooking recipe. Necessity count table 1026 retains count data as the necessity count information.

FIG. 36 shows an example of necessity count table 1026. As shown in FIG. 36, the count data, which is retained in necessity count table 1026, retains information related to "recipe ID," "recipe name," and the number of ingredients for each necessity.

The "recipe ID" and the "recipe name" are the same as the items included in recipe group master DB 111 shown in FIG. 3. The number of ingredients for each necessity indicates a numerical quantity of ingredients associated with each of necessities of "1" to "5" among a plurality of ingredients included in the corresponding cooking recipe.

In recipe specific ingredient profile table 421 shown in FIG. 15, a recipe ID of "R001," i.e., "winged dumpling" will be described as an example. The ingredients having a necessity of "5" are "dumpling skin," "water," "flour," "soy sauce," "potato starch," and "water." The ingredient having a necessity of "4" is only "cabbage." The ingredients having a necessity of "3" are "ground pork," "Japanese leek," and "oil." The ingredients having a necessity of "2" are "garlic chives" and "vinegar." The ingredient having a necessity of "1" is not included.

In this way, ingredient profile manager 1020 refers to recipe specific ingredient profile table 421 to count the number of ingredients for each necessity with respect to each cooking recipe, thereby making it possible to generate necessity count table 1026. In FIG. 36, a numerical quantity in the parentheses, which is described together with the number of ingredients having a necessity of "5," indicates a numerical quantity of foods except for seasonings.

Specific Display Example

In cooking recipe display system 1*e*, a specific example of the display image displayed on display screen 221 will be described.

In cooking recipe display system 1*e*, controller 210 of information processing terminal 200 generates a selected image for a cooking recipe, and displays the selected image on display screen 221.

Figure 37:
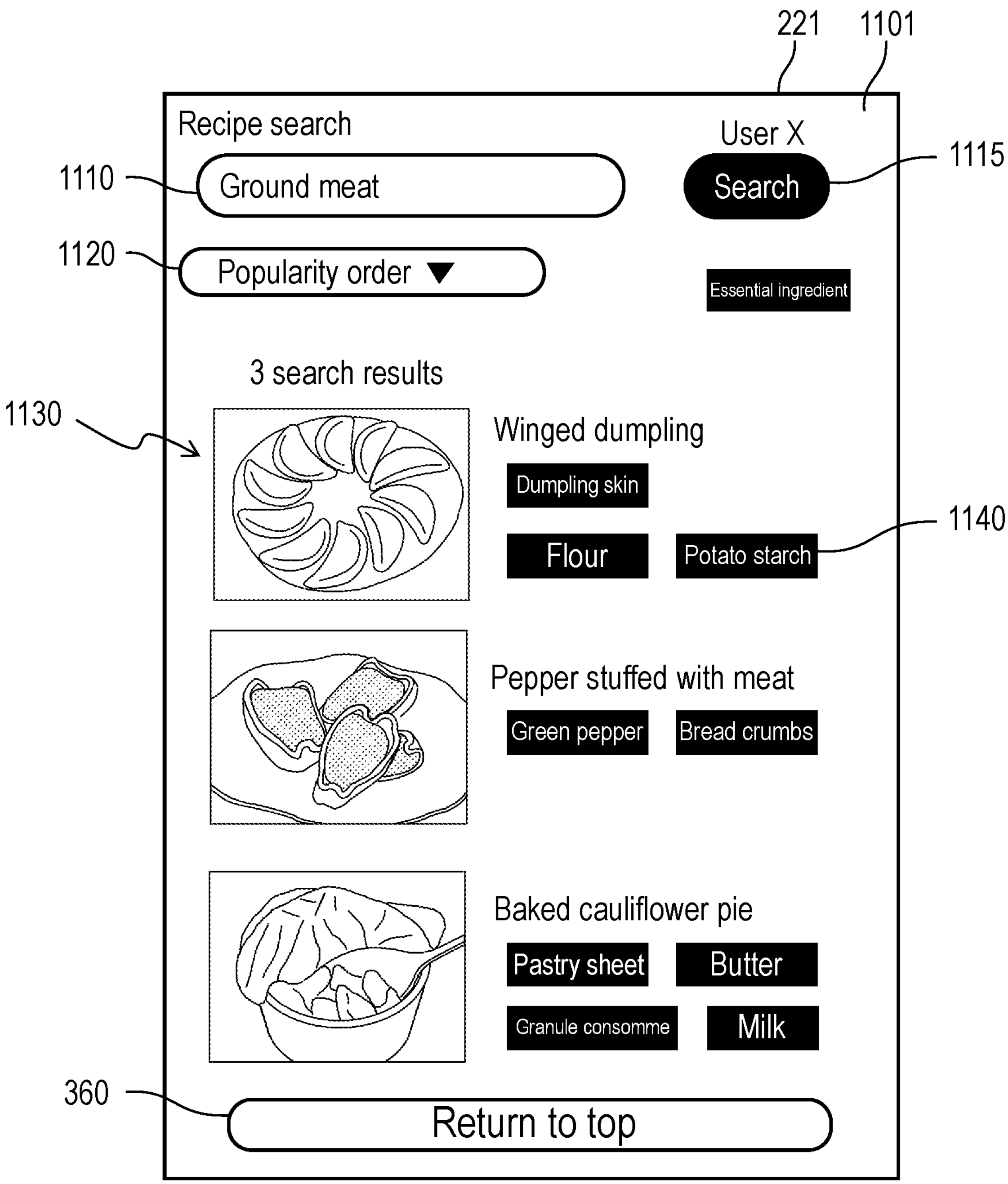
FIG. 37 is a view showing an example of a selected image.

FIG. 37 shows an example of the selected image. The selected image is an image that causes a user to select a cooking recipe. As shown in FIG. 37, selected image 1101 includes search window 1110, search button 1115, sort button 1120, search result 1130, auxiliary information label 1140, and return button 360.

Search window 1110 receives a text, which is inputted by a user. A user inputs a word (e.g., an ingredient, a cooking name) related to a cooking recipe of a dish, which is desired to be cooked, in search window 1110 as a search word. The search word inputted in search window 1110 is transmitted to recipe providing server 1000 through communication circuit 230.

Search button 1115 is a button for starting a search using the search word inputted in search window 1110. When search button 1115 is selected, recipe data manager 1101 starts searching for data related to a cooking recipe retained in recipe group master DB 111 as a target.

Sort button 1120 is a button for changing a display order of search results. For instance, in selected image 1101 shown in FIG. 37, search results 1130 are arranged in the order of popularity. The order of popularity is an order (ascending order or descending order) based on the number of times of selection of each cooking recipe, for example.

Figure 38:
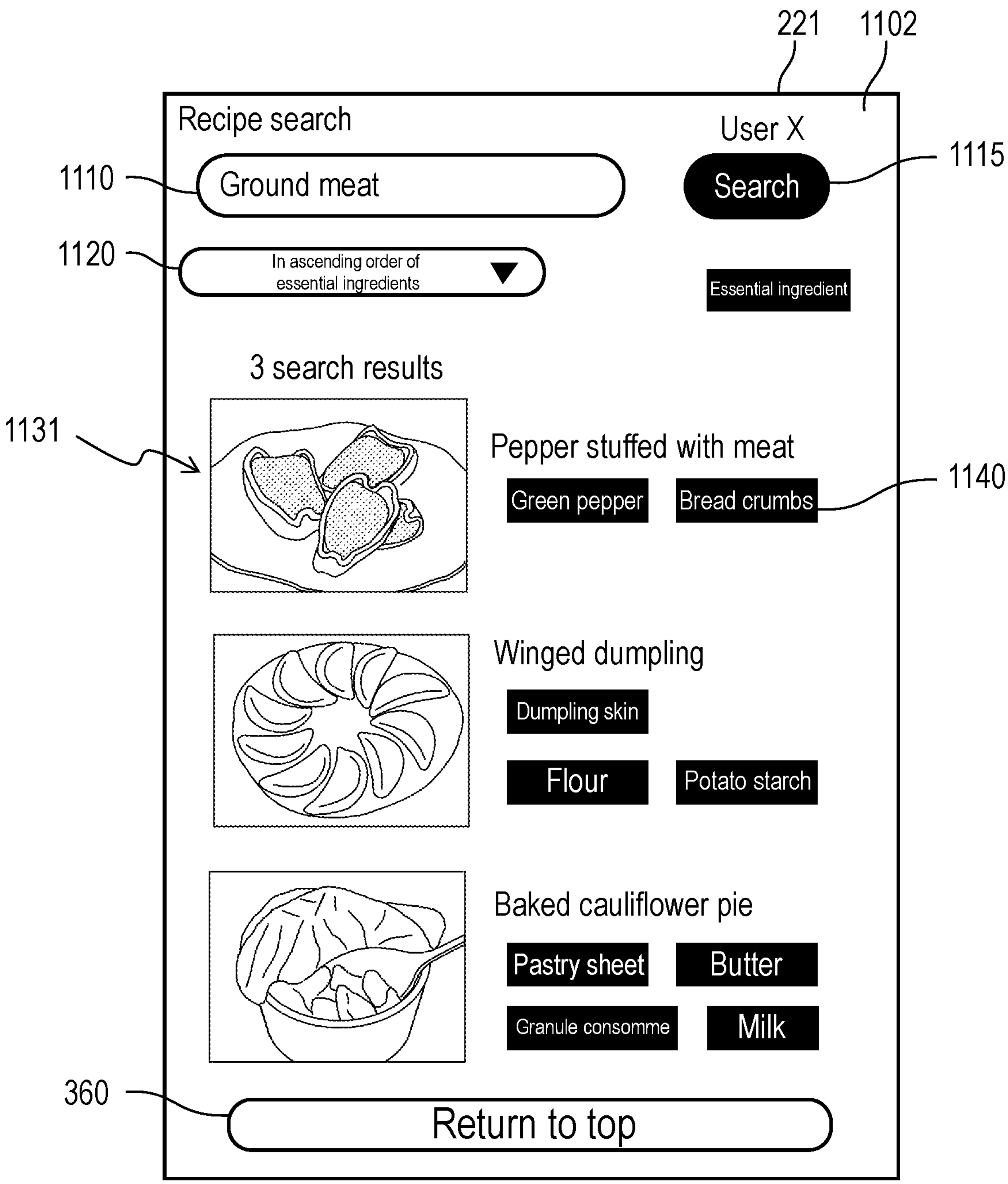
FIG. 38 is a view showing another example of the selected image.

A user can select sort button 1120 to change a display order. FIG. 38 shows another example of the selected image. For instance, as shown in FIG. 38, selected image 1102 includes search results 1131 in which cooking recipes are arranged in ascending order of essential foods. Search results 1131 are generated with reference to necessity count table 1026.

Specifically, ingredient profile manager 1020 compares the number of foods of each cooking recipe in descending order of necessities, and preferentially selects a cooking recipe of which the number of foods is small. If the number of foods, which have the same necessity, is the same, ingredient profile manager 1020 will perform the same comparison about the subsequent necessity.

In ingredient profile manager 1020, the comparison of the number of foods is performed sequentially down to a necessity of "1." Thus, cooking recipes are displayed on display screen 221 in ascending order of essential foods.

For instance, with respect to "winged dumpling," "baked cauliflower pie," and "pepper stuffed with meat," the number of foods having a necessity of "5" is 3, 4, and 2, respectively (see a numerical quantity in parentheses in necessity count table 1026 shown in FIG. 36).

Therefore, "pepper stuffed with meat," which has the smallest numerical quantity of foods, is displayed in the first order. "Winged dumpling" is displayed in the second order, and "baked cauliflower pie" is displayed in the third order. As a result, search results 1131 shown in FIG. 38 are obtained.

Search result 1130 or search result 1131 include an image and a name of a cooking recipe. At least one of the image or the name is selectable. When the image or the name is selected, an ingredient display image or a procedure display image is displayed on display screen 221.

Auxiliary information label 1140 is assigned to each cooking recipe. Auxiliary information label 1140 includes helpful information when a user selects a cooking recipe. In the present exemplary embodiment, auxiliary information label 1140, which is an example of auxiliary information corresponding to the necessity, indicates essential foods included in a cooking recipe.

In this way, essential foods are displayed as a list when a cooking recipe is selected. This makes it easy to determine whether the dish can be cooked or not, even if a cooking recipe is not selected to check necessary ingredients, a cooking procedure, and the like.

The display order of search results is not limited to the above-mentioned example. For instance, cooking recipes may be arranged in ascending order of essential ingredients. Specifically, ingredient profile manager 1020 compares the number of ingredients of each cooking recipe in descending order of necessities, and preferentially selects a cooking recipe of which the number of ingredients is small.

If the number of ingredients, which have the same necessity, is the same, ingredient profile manager 1020 will preferentially selects a cooking recipe of which the number of foods (i.e., a numerical quantity in parentheses) is small. If the number of ingredients and the number of foods, both having the same necessity, are completely the same, ingredient profile manager 1020 will perform the same comparison about the subsequent necessity.

After that, ingredient profile manager 1020 compares the number of ingredients and the number of foods sequentially down to a necessity of "1." Thus, cooking recipes are displayed on display screen 221 in ascending order of essential ingredients.

In the present exemplary embodiment, only an ingredient having the highest necessity of "5" is expressed as auxiliary information label 1140. However, the present disclosure is not limited to this. Ingredients having a necessity of a predetermined value or more (i.e., "3", "4") may be expressed as auxiliary information label 1140.

[Additional Remark]

As mentioned above, in cooking recipe display system 1*e* in accordance with the first aspect of the present disclosure, ingredient profile manager 1020 further manages necessity count information in which the number of ingredients, which are included in each of a plurality of cooking recipes, for each necessity is associated with each of the plurality of cooking recipes.

Thus, the number of ingredients having a high necessity is managed for each cooking recipe. The necessity count information can be used for a selected image of a cooking recipe, for example.

Controller 210 further generates a selected image for a plurality of cooking recipes, and displays the selected image on display screen 221. In the selected image, the display order of cooking recipes is determined based on the necessity count information. For instance, by preferentially displaying a cooking recipe of which an ingredient having a high necessity is a few, user's selection of cooking recipes can be supported.

Other Exemplary Embodiment

In the above-mentioned exemplary embodiment, a threshold (predetermined value) of an ingredient of which a display is omitted or a display mode is changed in a minimum display mode may be changeable. In other word, in the above-mentioned exemplary embodiment, a predetermined value of "2" has been described as an example. However, the predetermined value may be "1." It may be possible for a user to change the predetermined value.

The cooking recipe display system may include a home electric appliance that is communicably connected to any of recipe providing servers 100, 400, 600, 800, and 1000, or at least one of the above-mentioned recipe providing server or information processing terminal 200 through a network. The home electric appliance is a cooking appliance such as a microwave oven and an IH cooker (IH hot plate), or a refrigerator, for example.

For instance, any of recipe providing servers 100, 400, 600, 800, and 1000, or at least one of the above-mentioned recipe providing server or information processing terminal 200 transmits instructions for executing a procedure of a cooking recipe to a home electric appliance. The home electric appliance receives the transmitted instructions to perform processing according to the received instructions.

When a home electric appliance is a refrigerator, the refrigerator may manage information related to a kind, a storage period, or the like of ingredients stocked thereinside, and transmit the information to recipe providing server 100. Thus, stocked ingredient table 624 shown in FIG. 23 can be generated automatically.

An ingredient display image, a procedure display image, and a selected image are not limited to the examples shown in the above-mentioned exemplary embodiments. Display contents, a layout, and the like may be changed as necessary.

A database and a table are not limited to the examples in the above-mentioned exemplary embodiments. An item, contents, and the like of retained information may be changed as necessary.

In the above-mentioned exemplary embodiment, a part of processes to be executed by one processor may be executed by the other processor. The order of a plurality of processes may be changed, and a plurality of processes may be executed in parallel simultaneously.

A single device may be used to constitute a component included in the cooking recipe display system, or a plurality of devices may be used to constitute the component.

The cooking recipe display system in accordance with the above-mentioned exemplary embodiment may be achieved through centralized processing, or may be achieved through distributed processing. In the above-mentioned exemplary embodiment, all or a part of components, such as a controller, may be constituted by a dedicated hardware, or may be constituted by a combination of a software program, which is suitable for each component, and a general-purpose processor.

INDUSTRIAL APPLICABILITY

A cooking recipe display system of the present disclosure is applicable to home electronic appliances such as a cooking appliance and a refrigerator.

REFERENCE MARKS IN THE DRAWINGS

1*a*, 1*b*, 1*c*, 1*d*, and 1*e* cooking recipe display system
100, 400, 600, 800, and 1000 recipe providing server
110 and 810 recipe data manager
111 recipe group master DB
111*a* recipe ingredient table
111*b* and 811*b* recipe procedure table
120, 420, 620, 820, and 1020 ingredient profile manager
121 and 421 recipe specific ingredient profile table
122 necessity table
123, 123*a*, and 123*b* substitute ingredient profile table
130 and 230 communication circuit
200 information processing terminal
210 controller
211 data cache area
220 input/output circuit
221 display screen
301, 302, 501, and 502 ingredient display image
310 ingredient display button
320 procedure selection button
330, 575, 576, and 775 display switching button
335 amount selection button
340, 341, 540, and 541 ingredient list
350 auxiliary information icon
351 and 352 omissible icon
353 substitutable icon
355 essential icon
360 return button
370, 372, 570, 572, 770, and 772 substitute list image
371 ingredient name
390 finger
422 influence degree table
580 and 582 taste information image
624 stocked ingredient table
811*c* illustrated image DB
825 substitute image replacing table
901, 902, 903, and 904 procedure display image
941, 943, 945, 947, 951, and 953 display procedure
942, 944, 946, 948, 952, and 954 illustrated image
1026 necessity count table
1101 and 1102 selected image
1110 search window
1115 search button
1120 sort button
1130 and 1131 search result
1140 auxiliary information label

The invention claimed is:

1. A cooking recipe display system including an information processing terminal, the information processing terminal including a display screen and a controller, the cooking recipe display system being configured to display a cooking recipe on the display screen, the cooking recipe display system comprising:
a recipe data manager that is configured to manage recipe database retaining a plurality of cooking recipes, the plurality of cooking recipes each including one or more procedures and a plurality of ingredients, the one or more procedures indicating how to cook a dish, the plurality of ingredients being prepared for the dish; and
an ingredient profile manager that is configured to manage an ingredient profile indicating a necessity of each of the plurality of ingredients for each of the plurality of cooking recipes,
wherein
the controller is configured to display auxiliary information on the display screen based on the ingredient profile, the auxiliary information corresponding to the necessity of each of the plurality of ingredients that are included in a target recipe serving as one of the plurality of cooking recipes, and the necessity indicating how important each of the plurality of ingredients is to make the dish.

2. The cooking recipe display system according to claim 1, wherein
the ingredient profile manager is further configured to manage a substitute ingredient profile that indicates an ingredient substitutable for each of the plurality of ingredients.

3. The cooking recipe display system according to claim 2, wherein
the substitute ingredient profile includes a first substitute ingredient table in which the ingredient substitutable for each of the plurality of ingredients is associated with each of the plurality of ingredients.

4. The cooking recipe display system according to claim 2, wherein
the substitute ingredient profile includes a second substitution ingredient table indicating one or more groups to which each of the plurality of ingredients belongs, the one or more groups being included in a plurality of groups that are classified based on ingredient groups substitutable for each other.

5. The cooking recipe display system according to claim 2, wherein
for each of the plurality of ingredients, the substitute ingredient profile associates a difference in taste, notes, restrictions, or applications with each of the plurality of ingredients, the difference in taste being caused when each of the plurality of ingredients is used substitutionally.

6. The cooking recipe display system according to claim 1, wherein
the controller is configured to generate a first ingredient display image including all ingredients included in the target recipe and auxiliary information of each of all the ingredients, and display the first ingredient display image on the display screen.

7. The cooking recipe display system according to claim 6, wherein
the controller is further configured to:
generate a second ingredient display image of which a display mode for at least one part of all the ingredients is different from a display mode of the first ingredient display image depending on the necessity; and display either the first ingredient display image or the second ingredient display image on the display screen.

8. The cooking recipe display system according to claim 7, wherein the cooking recipe display system is configured such that an ingredient having a necessity of a predetermined value or less among all the ingredients is not displayed in the second ingredient display image.

9. The cooking recipe display system according to claim 7, wherein the cooking recipe display system is configured such that an ingredient having a necessity of a predetermined value or less among all the ingredients is displayed thinner than an ingredient having a necessity of more than the predetermined value in the second ingredient display image.

10. The cooking recipe display system according to claim 6, wherein the auxiliary information includes substitutable information, the substitutable information indicates that an ingredient corresponding to the substitutable information is substitutable, and the controller is allowed to receive a selection of the substitutable information displayed on the display screen, wherein when the substitutable information is selected, the controller is configured to display a list of substitute ingredients on the display screen, the substitute ingredients being substitutable for the ingredient corresponding to the substitutable information.

11. The cooking recipe display system according to claim 10, wherein the controller is allowed to receive a selection of the substitute ingredients displayed on the display screen, wherein when any of the substitute ingredients is selected, the controller is configured such that the first ingredient display image including the any of the substitute ingredients instead of the ingredient corresponding to the substitutable information is displayed on the display screen.

12. The cooking recipe display system according to claim 10, wherein the controller is configured to display the list of the substitute ingredients and information indicating characteristics of the substitute ingredients on the display screen.

13. The cooking recipe display system according to claim 10, wherein the ingredient profile manager further manages stock information indicating a storage situation of each of the plurality of ingredients, and the controller is configured to generate the list of the substitute ingredients based on the stock information, and display the list of the substitute ingredients on the display screen.

14. The cooking recipe display system according to claim 10, wherein the controller is further configured to:

generate a first procedure display image including a target procedure that is one of one or more procedures included in the target recipe, and a second procedure display image of which a display mode for at least one part of a plurality of ingredients included in the target procedure is different from a display mode of the first procedure display image depending on the necessity; and display the first procedure display image or the second procedure display image on the display screen.

15. The cooking recipe display system according to claim 14, wherein the cooking recipe display system is configured such that an ingredient having a necessity of a predetermined value or less is not displayed in the second procedure display image.

16. The cooking recipe display system according to claim 14, wherein the cooking recipe display system is configured such that an ingredient having a necessity of a predetermined value or less is displayed with a strikethrough line in the second procedure display image, the strikethrough line being applied to the ingredient.

17. The cooking recipe display system according to claim 14, wherein the cooking recipe display system is configured such that an ingredient having a necessity of a predetermined value or less is displayed thinner than an ingredient having a necessity of more than the predetermined value.

18. The cooking recipe display system according to claim 14, wherein the controller displays any of the substitute ingredients instead of an ingredient included in the first procedure display image or the second procedure display image, the any of the substitute ingredients being substitutable for the ingredient.

19. The cooking recipe display system according to claim 6, wherein:

the auxiliary information includes omissible information, the omissible information indicates that an ingredient corresponding to the omissible information is omissible, and the controller is allowed to receive a selection of the omissible information displayed on the display screen, wherein when the omissible information is selected, the controller is configured to display information on the display screen, the information indicating an influence on the dish when the ingredient corresponding to the omissible information is omitted.

20. The cooking recipe display system according to claim 6, wherein the auxiliary information includes essential information, the essential information indicates that an ingredient corresponding to the essential information is essential, and the controller is allowed to receive a selection of the essential information displayed on the display screen, wherein when the essential information is selected, the controller is configured to display information on the display screen, the information indicating a reason why the ingredient corresponding to the essential information is essential.

21. The cooking recipe display system according to claim 1, wherein:

the ingredient profile further indicates an influence degree of each of the plurality of ingredients on a taste for each of the plurality of cooking recipes; and the controller is configured to display taste information on the display screen based on the ingredient profile, the taste information corresponding to the influence degree of each of the plurality of ingredients included in the target recipe on the taste.

22. The cooking recipe display system according to claim 1, wherein the ingredient profile manager further manages necessity count information in which a numerical quantity of ingredients for each necessity is associated with each of the plurality of cooking recipes, the ingredients being included in each of the plurality of cooking recipes.

23. The cooking recipe display system according to claim 22, wherein the controller further generates a selected image for selecting the plurality of cooking recipes and displays the selected image on the display screen, wherein based on the necessity count information, a display order of cooking recipes is determined in the selected image.

24. A cooking recipe display device comprising:

a display screen; and a controller, wherein the cooking recipe display device is configured to display a cooking recipe on the display screen wherein for each of a plurality of cooking recipes that include one or more procedures indicating how to cook a dish and a plurality of ingredients prepared for the dish, the controller is configured to display auxiliary information on the display screen based on an ingredient profile indicating a necessity of each of the plurality of ingredients, the auxiliary information corresponding to the necessity of each of the plurality of ingredients included in a target recipe serving as one of the plurality of cooking recipes, and the necessity indicating how important each of the plurality of ingredients is to make the dish.

25. A cooking recipe display method displaying a cooking recipe on a display screen, the cooking recipe display method comprising displaying auxiliary information on the display screen based on an ingredient profile indicating a necessity of each of a plurality of ingredients for each of a plurality of cooking recipes that include one or more procedures indicating how to cook a dish and the plurality of ingredients prepared for the dish, the auxiliary information corresponding to the necessity of each of the plurality of ingredients included in a target recipe serving as one of the plurality of cooking recipes, and the necessity indicating how important each of the plurality of ingredients is to make the dish.

26. A program configured to cause a computer to execute the cooking recipe display method according to claim 25.

* * * * *